(12) United States Patent
Osaka et al.

(10) Patent No.: US 10,107,987 B2
(45) Date of Patent: Oct. 23, 2018

(54) LENS HOLDER DRIVE DEVICE AND CAMERA-EQUIPPED PORTABLE TERMINAL

(71) Applicants: Tomohiko Osaka, Tokyo (JP); Takashi Ishizawa, Tokyo (JP)

(72) Inventors: Tomohiko Osaka, Tokyo (JP); Takashi Ishizawa, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/319,064

(22) PCT Filed: Jun. 18, 2015

(86) PCT No.: PCT/JP2015/067568
§ 371 (c)(1),
(2) Date: Dec. 15, 2016

(87) PCT Pub. No.: WO2016/002528
PCT Pub. Date: Jan. 7, 2016

(65) Prior Publication Data
US 2017/0115463 A1 Apr. 27, 2017

(30) Foreign Application Priority Data
Jul. 4, 2014 (JP) ................................. 2014-138233

(51) Int. Cl.
*G02B 7/02* (2006.01)
*H04M 1/02* (2006.01)

(52) U.S. Cl.
CPC .......... *G02B 7/023* (2013.01); *H04M 1/0264* (2013.01)

(58) Field of Classification Search
CPC ............................. G02B 7/023; H04M 1/0264
(Continued)

(56) References Cited

U.S. PATENT DOCUMENTS

| | | |
|---|---|---|
| 2011/0205646 A1 | 8/2011 | Sato et al. |
| 2017/0123180 A1 | 5/2017 | Osaka et al. |

FOREIGN PATENT DOCUMENTS

| | | |
|---|---|---|
| CN | 102480589 A | 5/2012 |
| CN | 106662722 A | 5/2017 |

(Continued)

OTHER PUBLICATIONS

International Search Report from International Application No. PCT/JP2015/067568 dated Sep. 15, 2015.

*Primary Examiner* — William Choi
(74) *Attorney, Agent, or Firm* — Brundidge & Stanger, P.C.

(57) ABSTRACT

A lens holder drive device has: a lens holder; a fixing part that includes a base member disposed below the lens holder; a drive mechanism; an upper-side plate spring; a lower-side plate spring; and a position detection unit that detects the position of the lens holder in the optical axis direction. The drive mechanism has: a drive coil fixed to the perimeter of the lens holder; a yoke having a substantially square columnar shape; and a drive magnet disposed to face the drive coil in a first direction which is orthogonal to the optical axis direction. The position detection unit includes: a sensor magnet attached to an outer circumferential surface of the lens holder in a second direction which is orthogonal to the optical axis direction and the first direction; and a magnetic sensing element that faces the sensor magnet and is provided to the base member.

12 Claims, 28 Drawing Sheets

(58) Field of Classification Search
USPC ........ 359/811, 813, 814, 819, 822, 823, 824
See application file for complete search history.

(56) References Cited

FOREIGN PATENT DOCUMENTS

| | | | | |
|---|---|---|---|---|
| JP | 2007-121850 | A | | 5/2007 |
| JP | 2007121850 | A | * | 5/2007 |
| JP | 2008-224915 | A | | 9/2008 |
| JP | 2008224915 | A | * | 9/2008 |
| JP | 2010-091894 | A | | 4/2010 |
| JP | 2010091894 | A | * | 4/2010 |
| JP | 2011-169443 | A | | 9/2011 |
| JP | 2012-177753 | A | | 9/2012 |
| JP | 2013-033179 | A | | 2/2013 |
| JP | 2013-238764 | A | | 11/2013 |

* cited by examiner

| ITEM | Pattern |
|---|---|
| Pin1 | ACT Terminal (+) |
| Pin2 | Hall output (−) |
| Pin3 | Hall input (+) |
| Pin4 | GND |
| Pin5 | Hall output (+) |
| Pin6 | Hall input (−) |
| Pin7 | ACT Terminal (−) |

LENS HOLDER DRIVE DEVICE AND CAMERA-EQUIPPED PORTABLE TERMINAL

TECHNICAL FIELD

The present invention relates to a lens holder driving device, and particularly relates to a lens holder driving device and a camera-equipped mobile terminal in which a lens holder (movable part) to which a lens barrel can be attached can move in a light axis direction of a lens.

BACKGROUND ART

A small-sized mobile camera is installed in a camera-equipped mobile terminal. In this small-sized mobile camera, an auto focus (AF) lens holder driving device is used. VCM systems using a voice coil motor (VCM) are known as a driving mechanism (actuator) used for the above-mentioned AF lens holder driving device. An AF lens holder driving device of the VCM type includes a magnetic circuit composed of a driving coil, a yoke and a permanent magnet as a driving mechanism (actuator). The driving mechanism of the VCM type is roughly categorized into the driving mechanism of "moving coil type" and the driving mechanism of "moving magnet type."

An AF lens holder driving device of the VCM type employs a spring member (elastic member) that supports a columnar movable part including a lens (a lens and a lens holder) such that the movable part is displaceable in the light axis direction (center axis direction) in a state where the position of the movable part in the radial direction with respect to the fixing part is set. It is to be noted that the movable part is also referred to as moving body, movable body, or lens fixing body, and the fixing part is also referred to as fixing member, supporting body, housing, or fixing body. The above-mentioned driving mechanism is provided in the movable part (moving body) and the fixing part (fixing member; supporting body).

As the above-mentioned spring member (elastic member), in general, a pair of leaf springs which are provided on the both sides in the light axis direction of a lens holder (columnar movable part; moving body) that holds a lens assembly (lens barrel) are used. The pair of leaf springs supports the lens holder (columnar movable part; moving body) such that the lens holder (columnar movable part; moving body) is displaceable in the light axis direction in a state where the position in the radial direction of the lens holder is set with respect to the housing (cylindrical fixing part; fixing member; supporting body) disposed at the periphery thereof. One of the pair of leaf springs is referred to as upper leaf spring, and the other is referred to as lower leaf spring.

It is to be noted that the upper leaf spring is also referred to as front spring or front spring member, and the lower leaf spring is also referred to as rear spring or rear spring member.

With the above-mentioned configuration, in an AF lens holder driving device of the VCM type, the restoration force (biasing force) of the leaf spring (spring member) and the thrust (driving force) of the driving mechanism are balanced, and the movable part (moving body) is moved to a predetermined position (target position) in the light axis direction. In the AF lens holder driving device of the VCM type having such a configuration, the movable part (moving body) is supported with the leaf spring (spring member) with respect to the fixing part (fixing member; housing; supporting body), and therefore the movable part (moving body) is vibrated more than necessary by driving of the movable part (moving body), or by vibration, impact and the like from the outside.

In view of this, a position detection part (position detection mechanism; position detection means) is provided to the lens holder driving device to control (adjust) the position of the movable part by feedback control. Conventionally, various position detection parts have been proposed.

For example, PTL 1 discloses a lens driving device that performs hand shake correction by utilizing a position detection mechanism using a Hall device sensor magnet and a Hall device sensor. The lens driving device disclosed in PTL 1 includes a cylindrical lens supporting body, an annular yoke, and a plurality of driving magnets. The cylindrical lens supporting body extends in the longitudinal direction and the coil is placed on the outer periphery side. The yoke is placed on the outside of the lens supporting body in the radial direction. The driving magnets are respectively placed at positions on the inside of the external peripheral wall of the annular peripheral wall of the yoke and the outside of the coil in the radial direction with a predetermined distance from the coil. In addition, the driving magnets are placed with a predetermined distance from the adjacent driving coil in the circumferential direction of the yoke.

In PTL 1, the Hall device sensor magnet is placed at the lens supporting body at a position between adjacent two driving magnets in the circumferential direction of the yoke in the driving magnets. The Hall device sensor is placed to a base to which the yoke and the lens supporting body are installed. A cutout part is formed in the driving magnet at the side surface opposite to the adjacent driving magnet.

PTL 2 discloses an image pickup device including an actuator and a position detection part. The actuator is composed of a coil attached on a driven surface of a movement cylindrical body that holds a plurality of lenses, a magnet opposite to the coil, and a yoke disposed at the periphery of the magnet. The position detection part is composed of one Hall device magnet attached on the movement cylindrical body, and a Hall device provided on an assembly housing side opposite to the movement cylindrical body and configured to detect the magnetic force of the Hall device magnet to perform position detection.

PTL 3 discloses a lens driving device including an actuator and a position detection means. The actuator includes a coil body fixed at the outer periphery of a lens supporting body that supports a lens at the inner periphery, a yoke that movably supports the lens supporting body, and four driving magnets fixed at corner portions of the outer periphery side wall of the yoke. The inner periphery side of each driving magnet has an arc-like shape extending along the outer peripheral surface of the coil.

In addition, in the third embodiment in PTL 3, the position detection means that detects the position of the lens supporting body with respect to the fixing body in the X direction, the Y direction and the Z direction is composed of a X-direction position detection magnet, a Y-direction position detection magnet, and a Z-direction position detection magnet disposed on the side surface of the lens supporting body, and, a X-direction position detection device, a Y-direction position detection device, and a Z-direction position detection device disposed on the external surface of the lens driving device so as to be respectively opposite to the direction position detection magnets.

It is to be noted that the Z-direction position detection magnet is magnetized to have opposite magnetic poles in the Z direction (light axis direction). To be more specific, when the driving magnet is magnetized such that the inner periphery side is N pole and the outer periphery side is S pole, the Z-direction position detection magnet is magnetized such that the front side (upper side) thereof is N pole and the rear side (lower side) thereof is S pole in the light axis direction. In the lens supporting body, a weight is fixed for the purpose of balancing the weight balance with the three position detection magnets. The position detection magnets and the weight are disposed at positions corresponding to the space part of the yoke.

CITATION LIST

Patent Literature

PTL 1
Japanese Patent Application Laid-Open No. 2013-33179
PTL 2
Japanese Patent Application Laid-Open No. 2007-121850 (FIG. 3, [0023] and [0024])
PTL 3
Japanese Patent Application Laid-Open No. 2012-177753 (FIG. 9 to FIG. 14, [0069])

SUMMARY OF INVENTION

Technical Problem

The position detection mechanism disclosed in PTL 1 detects the position in the X axis direction and the Y-axis direction orthogonal to the optical axis (Z axis) of the lens supporting body, not the position in the light axis direction (the Z-axis direction) of the lens supporting body. That is, with the configuration of the position detection mechanism disclosed in PTL 1, the position in the light axis direction (the Z-axis direction) of the lens supporting body cannot be detected.

In the position detection part disclosed in PTL 2, only one Hall device magnet is attached to the movement cylindrical body, and consequently the gravity center of the moving body (the lenses, the movement cylindrical body, the coil, and the Hall device magnet) is shifted from the optical axis. As a result, with an image pickup device including the position detection part disclosed in PTL 2, it is difficult to stably drive the moving body with a good balance.

In the lens driving device disclosed in PTL 3, the four driving magnets whose inner periphery side is formed in an arc-like shape are fixed at the corner portions of the outer periphery side wall of the yoke. Accordingly, the driving magnet and the position detection magnet are disposed in proximity to each other, and consequently the position detection means may possibly be negatively influenced by the magnetic flux generated at the driving magnet. In addition, since the inner periphery side of each driving magnet has an arc-like shape, manufacturing of the driving magnet is difficult.

Accordingly, an object of the present invention is to provide a lens holder driving device in which the position detection part can correctly detect the position of the lens holder in the light axis direction without causing negative influence on the position detection part.

Other objects of the present invention will be apparent from the following descriptions.

Solution to Problem

In an exemplary mode of the present invention, a lens holder driving device includes: a lens holder to which a lens barrel is attachable; a fixing part disposed at an outer periphery of the lens holder; a driving mechanism for driving the lens holder in a direction of an optical axis of a lens; an upper leaf spring configured to couple the lens holder and the fixing part at an upper part thereof; a lower leaf spring configured to couple the lens holder and the fixing part at a lower part thereof; and a position detection part configured to detect a position of the lens holder in the direction of the optical axis. The fixing part includes a base member disposed on a lower side of the lens holder. The driving mechanism includes a driving coil fixed at a periphery of the lens holder, a yoke having a substantially quadrangular cylindrical shape uprightly provided on the base member, and a driving magnet including plate-shaped driving magnet pieces which are disposed at a pair of inner wall surfaces of the yoke opposite to each other in a first direction orthogonal to the direction of the optical axis, the plate-shaped driving magnet pieces being disposed to be opposite to the driving coil. The position detection part includes a sensor magnet as one of a pair of sensor magnets attached on corresponding outer peripheral surfaces of the lens holder in a second direction orthogonal to the direction of the optical axis and the first direction, and a magnetic detection device provided to the base member such that the magnetic detection device is opposite to the sensor magnet.

Advantageous Effects of Invention

According to the present invention, the position detection part can correctly detect the position of the lens holder in the light axis direction without causing negative influence on the position detection part.

BRIEF DESCRIPTION OF DRAWINGS

FIG. 8B showing a relationship between seven terminals of the conductor pattern of flexible printed circuit (FPC) and terminals connected to the seven terminals;

DESCRIPTION OF EMBODIMENTS

In the following, embodiments of the present invention are described with reference to the accompanying drawings.

(First Embodiment)

With reference to FIG. 1 to FIG. 4, lens holder driving device 10 according to a first embodiment of the present invention is described.

Figure 1:
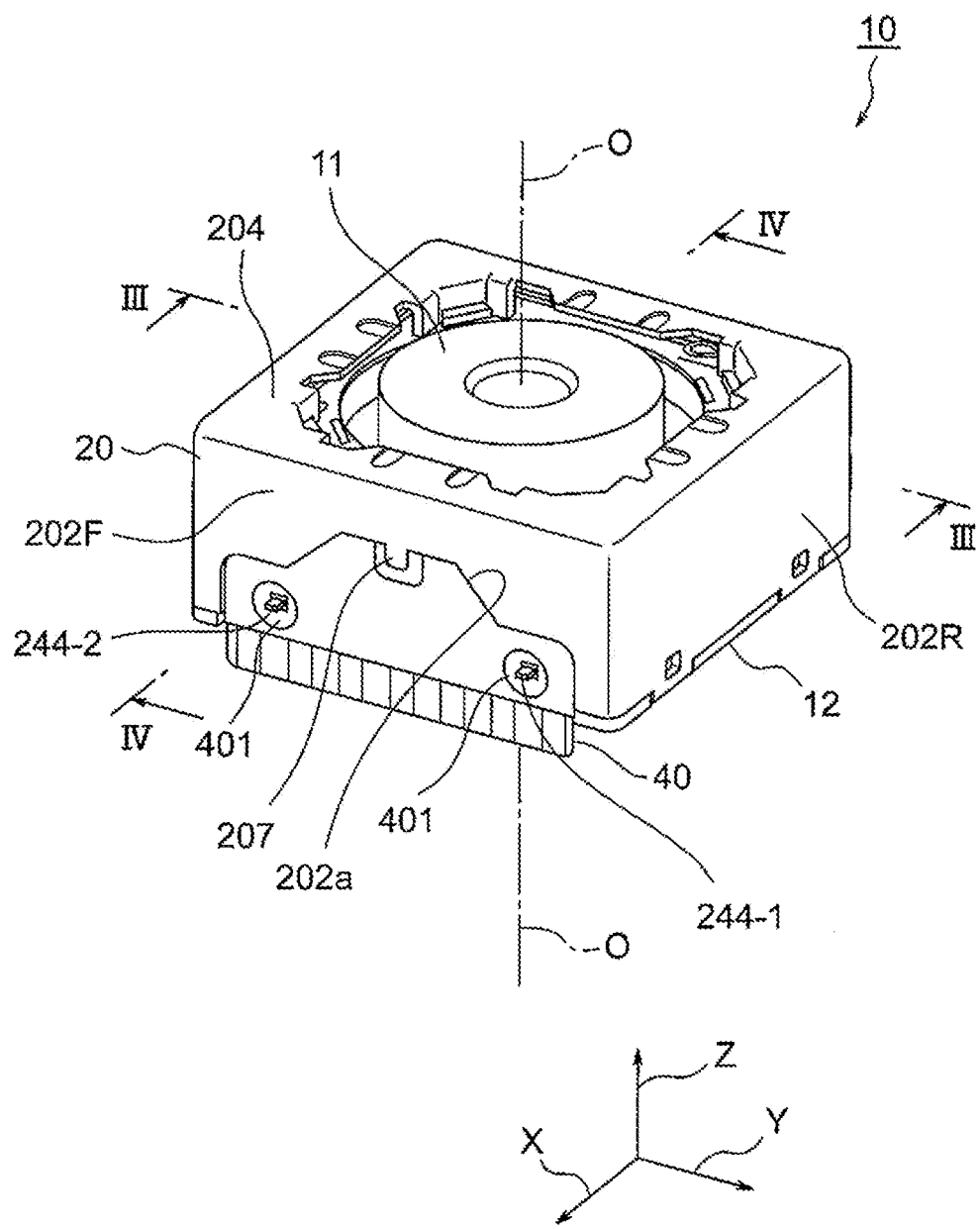
FIG. 1 is a perspective view of an external appearance of a lens holder driving device according to a first embodiment of the present invention.
Figure 2:
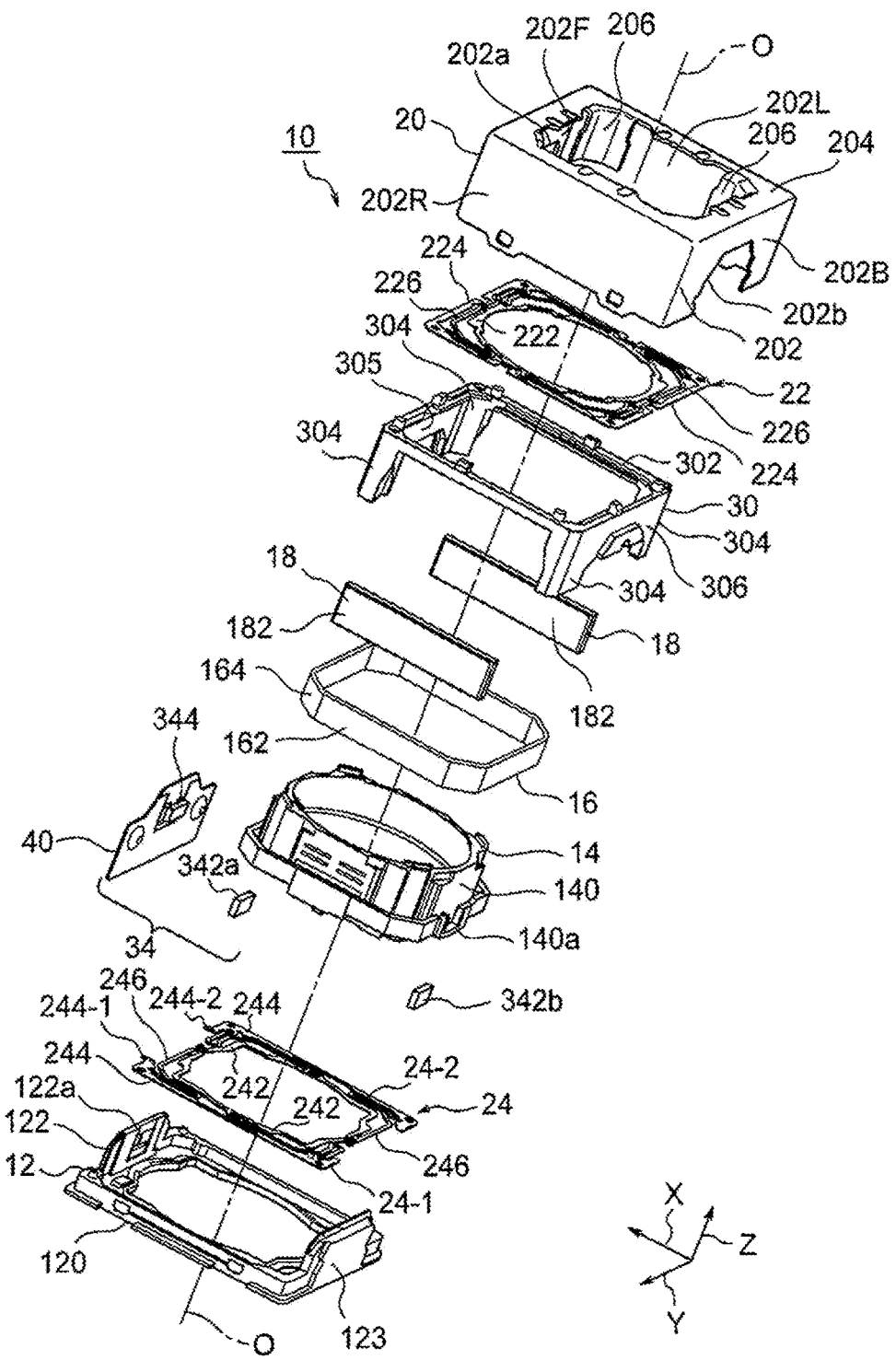
FIG. 2 is an exploded perspective view of the lens holder driving device illustrated in FIG. 1.
Figure 3:
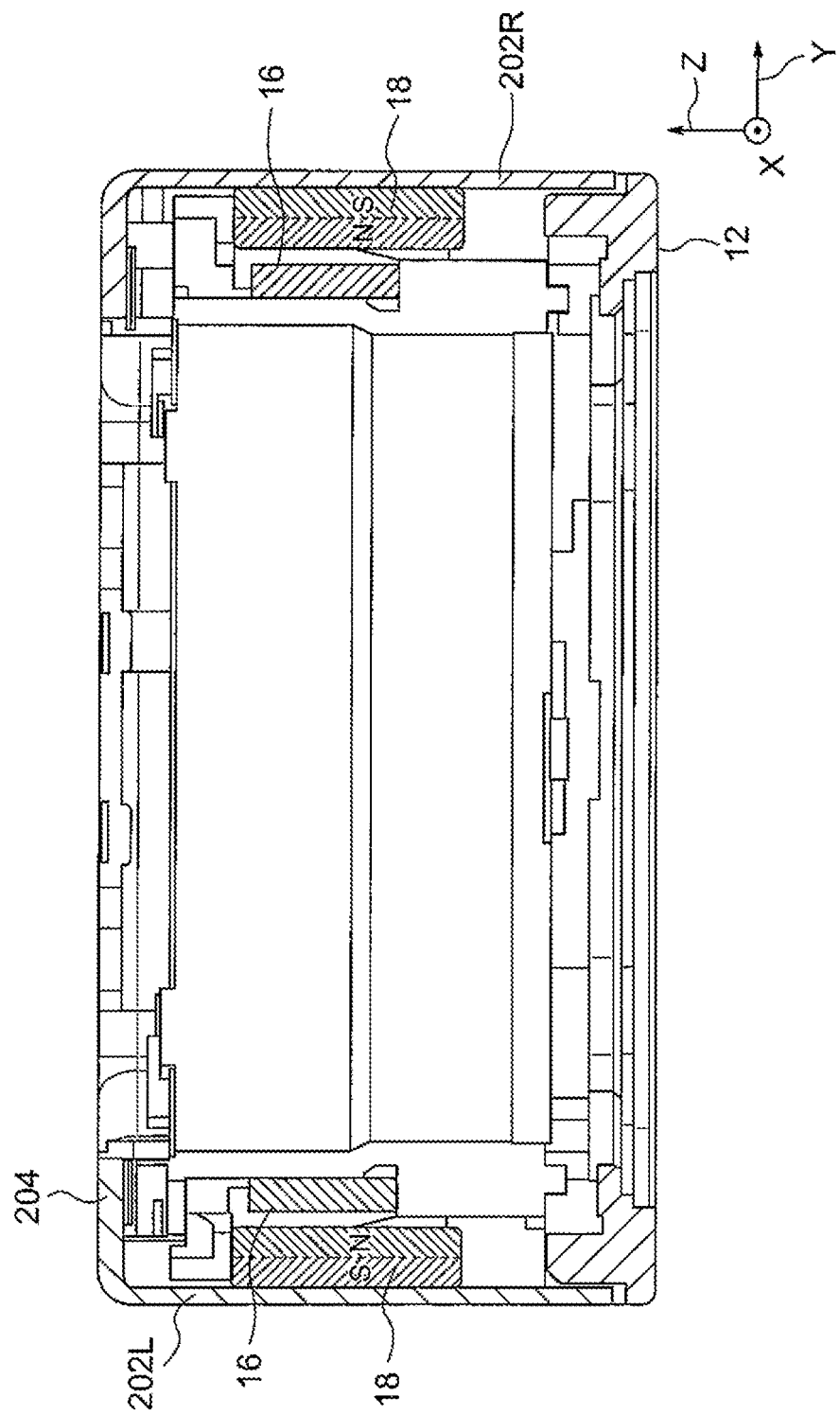
FIG. 3 is a longitudinal sectional view taken along the line of FIG. 1.
Figure 4:
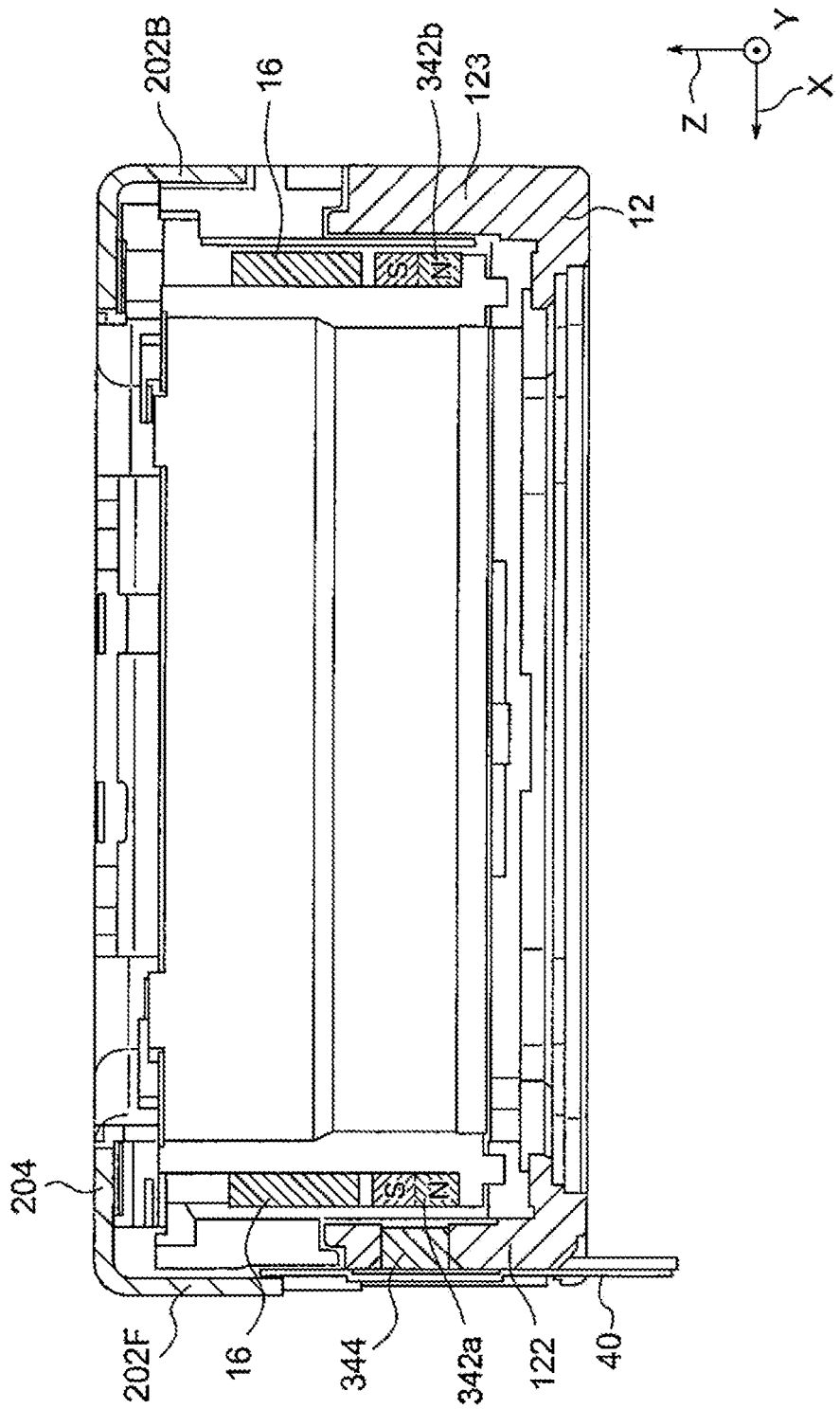
FIG. 4 is a longitudinal sectional view taken along the line IV-IV of FIG. 1.

FIG. 1 is a perspective view illustrating an external appearance of lens holder driving device 10. FIG. 2 is an exploded perspective view of lens holder driving device 10. FIG. 3 is a longitudinal sectional view taken along the line of FIG. 1. FIG. 4 is a longitudinal sectional view taken along the line IV-IV of FIG. 1.

Here, as illustrated in FIG. 1 to FIG. 4, an orthogonal coordinate system (X, Y, Z) is used. In the orthogonal coordinate system (X, Y, Z) of FIG. 1 to FIG. 4, the X-axis direction is the front-rear direction (depth direction), the Y-axis direction is the horizontal direction (width direction), and the Z-axis direction is the vertical direction (height direction). In addition, in the example illustrated in FIG. 1 to FIG. 4, vertical direction Z is the direction of optical axis O of the lens. It is to be noted that, in the present embodiment, the Y-axis direction (horizontal direction) is also referred to as first direction, and the X-axis direction (front-rear direction) is also referred to as second direction.

It should be noted that, when actually used, the direction of optical axis O, that is, the Z-axis direction is the front-rear direction. In other words, the upward direction of the Z axis is the forward direction, and the downward direction of the Z axis is the rearward direction.

Lens holder driving device 10 illustrated in the drawing is a lens holder driving device that employs a voice coil motor (VCM) system using a VCM as the driving mechanism (actuator). The lens holder driving device of the VCM type includes a driving coil, and a magnetic circuit composed of a yoke and a permanent magnet as the driving mechanism (actuator) as described later. Lens holder driving device 10 illustrated in the drawing employs a driving mechanism of "moving coil type" as the driving mechanism of the VCM type.

Lens holder driving device 10 illustrated in the drawing is used in a mobile terminal capable of performing auto focus (AF) such as a camera-equipped mobile phone, a smartphone described later illustrated in FIG. 33, a note-type personal computer, a tablet-type personal computer, a mobile game machine, a Web camera, and an in-vehicle camera.

Lens holder driving device 10 illustrated in the drawing is intended for moving lens holder 14 (described later) that holds lens barrel 11 in the direction of optical axis O. Accordingly, optical axis O is the driving axis (central axis). Lens holder driving device 10 includes base member (actuator base) 12 disposed on the lower side (rear side) in the Z-axis direction (the direction of optical axis O).

At a lower portion (rear portion) of base member (actuator base) 12, a sensor substrate (not illustrated) is disposed. On the sensor substrate, electronic components such as an imaging device and a clock generation source are installed. Lens holder driving device 10 and the sensor substrate are covered with a shield case (not illustrated). The shield case blocks electromagnetic noise generated by the sensor substrate.

A camera module is composed of a combination of lens holder driving device 10, the sensor substrate, the imaging device, and the shield case.

The imaging device captures a subject image imaged by lens barrel 11 and converts the image into an electric signal. The imaging device is composed of, for example, a charge coupled device (CCD) image sensor, a complementary metal oxide semiconductor (CMOS) image sensor or the like.

Lens holder driving device 10 includes: lens holder 14 including cylindrical part 140 for holding lens barrel 11; ring-shaped driving coil 16 fixed to lens holder 14 such that it is located at the outer periphery of cylindrical part 140; yoke 20 having a substantially quadrangular cylindrical shape including driving magnet 18 that is opposite to driving coil 16; and a pair of leaf springs 22 and 24 provided on both sides of cylindrical part 140 of lens holder 14 in the direction of optical axis O.

To attach lens barrel 11 to lens holder 14, lens barrel 11 is housed in lens holder 14, and lens barrel 11 and lens holder 14 are joined to each other with adhesive agent or the like.

In addition, the magnetic circuit is composed of a combination of driving magnet 18 and yoke 2.

The pair of leaf springs 22 and 24 supports lens holder 14 such that lens holder 14 is displaceable in the direction of optical axis O while setting the position of lens holder 14 in the radial direction. Regarding the pair of leaf springs 22 and 24, leaf spring 22 is referred to as upper leaf spring, and leaf spring 24 is referred to as lower leaf spring.

In addition, as described above, when actually used, the upward direction of the Z-axis direction (the direction of optical axis O) is the forward direction, and the downward direction of the Z-axis direction (the direction of optical axis O) is the rearward direction. Accordingly, upper leaf spring 22 is also referred to as front spring, and lower leaf spring 24 is also referred to as rear spring.

Upper leaf spring (front spring) 22 and lower leaf spring (rear spring) 24 are formed of a metal such as stainless steel, beryllium copper and nickel copper. In addition, upper leaf spring (front spring) 22 and lower leaf spring (rear spring) 24 is manufactured by working such as etching using photolithographic technique and pressing with a predetermined thin plate. Regarding the working, etching is preferable than pressing. The reason for this is that no residual stress is left in the leaf spring which has been subjected to etching.

In addition, preferably, the material of the leaf spring is stainless steel, or in particular, high-hardness stainless steel than beryllium copper. The reason for this is that a compound of beryllium is known to be highly toxic, and it is desirable to use materials other than beryllium copper as the material of the leaf spring (beryllium free) from the standpoint of environmental conservation. It is to be noted that as the high-hardness stainless steel, NTK S-4 or NTK 301 (SUS301) available from Nippon Metal Industry Co., Ltd. may be used.

As illustrated in FIG. 1 and FIG. 2, yoke 20 has a substantially quadrangular cylindrical shape. That is, yoke 20 includes outer cylinder part 202 having a substantially square cylindrical shape, and upper end portion 204 having a substantially quadrangular ring shape protruding to the inner side of outer cylinder part 202 at the upper end (front end) of outer cylinder part 202. In addition, at the four corners of the inner side of ring-shaped upper end part 204, yoke 20 includes four inner vertical extending parts 206 extending perpendicularly downward in a direction parallel to optical axis O.

Accordingly, driving coil 16 also has a substantially quadrangular cylindrical shape that matches the substantially quadrangular cylindrical shape of yoke 20. Specifically, driving coil 16 has an octagonal cylindrical shape with four long side parts 162 disposed to be parallel to and opposite to the four sides of yoke 20, and four short side parts 164 that are opposite to the four corners of yoke 20. Driving coil 16 is attached to the exterior wall of cylindrical part 140 of lens holder 14 in a region on a side closer to upper leaf spring 22 such that driving coil 16 is housed in a space between outer cylinder part 202 of yoke 20 and four inner vertical extending parts 206.

As illustrated in FIG. 2 and FIG. 3, driving magnet 18 illustrated in the drawing is composed of two plate-shaped driving magnet pieces 182 that are disposed at two inner wall surfaces of outer cylinder part 202 of yoke 20 which are opposite to each other in horizontal direction Y such that two plate-shaped driving magnet pieces 182 are opposite to driving coil 16 with a space therebetween. In other words, each plate-shaped driving magnet piece 182 is extended such that the both ends thereof in the horizontal direction are located at a region close to the two sides of yoke 20 opposite to each other in the front-rear direction X. In addition, driving coil 16 is disposed such that it is close to a region around the both ends of each plate-shaped driving magnet piece 182 in the horizontal direction.

With this structure, reduction in the magnetic efficiency of the magnetic circuit can be suppressed.

Each plate-shaped driving magnet piece 182 is magnetized in the radial direction, and the inner periphery side and the outer periphery side thereof are magnetized in different polarities. In the example illustrated in the drawing, each plate-shaped driving magnet piece 182 is magnetized such that the inner periphery side is magnetized to N pole, and the outer periphery side is magnetized to S pole as illustrated in FIG. 3.

The driving mechanism of "moving coil type" is composed of the combination of driving coil 16, two plate-shaped driving magnet pieces 182 and yoke 20.

Outer cylinder part 202 of yoke 20 is composed of front plate part 202F and rear plate part 202B that are opposite to each other in front-rear direction X, and left plate part 202L and right plate part 202R that are opposite to each other in horizontal direction Y. Front plate part 202F includes front cutout part 202a that opens downward, and rear plate part 202B includes rear cutout part 202b that opens downward. Front plate part 202F includes protrusion part 207 that protrudes downward at front cutout part 202a. Front plate part 202F is also referred to as first plate part, and rear plate part 202B is also referred to as second plate part. In addition, front cutout part 202a is also referred to as first cutout part, and rear cutout part 202b is also referred to as second cutout part.

On the other hand, base member (actuator base) 12 includes base part 120 having a rectangular ring-shape, and a pair of protruding parts 122 and 123 that are opposite to each other in front-rear direction X and protrude upward in vertical direction Z from base part 120. Here, protruding part 122 provided on the front side is referred to as front protruding part, and protruding part 123 provided on the rear side is referred to as rear protruding part. In addition, front protruding part 122 is also referred to as first protruding part, and rear protruding part 123 is also referred to as second protruding part.

Lens holder driving device 10 illustrated in the drawing further includes spacer 30 provided between base member (actuator base) 12 and yoke 20. Spacer 30 is also referred to as inner housing. Spacer (inner housing) 30 has a shape which is substantially housed in the inner wall surface of yoke 20. To be more specific, spacer (inner housing) 30 includes: ring-shaped part 302 having a rectangular external shape provided at the upper portion of the inner wall surface of outer cylinder part 202 of yoke 20; four vertical extending parts 304 perpendicularly extending in a downward direction parallel to optical axis O from the four corners of ring-shaped part 302; and a pair of U-shaped plate parts 305 and 306 extending in a downward direction parallel to optical axis O from a pair of the sides of ring-shaped part 302 which are opposite to each other in front-rear direction X. Here, U-shaped plate part 305 provided on the front side is referred to as front U-shaped plate part, and U-shaped plate part 306 provided on the rear side is referred to as rear U-shaped plate part. In addition, front U-shaped plate part 305 is also referred to as first U-shaped plate part, and rear U-shaped plate part 306 is also referred to as second U-shaped plate part.

The fixing part (12, 30) is composed of the combination of base member (actuator base) 12 and spacer (inner housing) 30.

As illustrated in FIG. 2 and FIG. 4, in a region around front cutout part (first cutout part) 202a of yoke 20, front protruding part (first protruding part) 122 of base member 12 and front U-shaped plate part (first U-shaped plate part) 305 of spacer (inner housing) 30 are engaged with each other (in engagement). In addition, in a region around rear cutout part (second cutout part) 202b of yoke 20, rear protruding part (second protruding part) 123 of base member 12 and rear U-shaped plate part (second cutout part) 306 of spacer (inner housing) 30 are engaged with each other (in engagement).

It is to be noted that front protruding part (first protruding part) 122 of base member 12 has rectangular hole 122a through which hole sensor 344 that is the magnetic detection device described later is inserted. In addition, cylindrical part 140 of lens holder 14 includes a pair of housing parts 140a for housing a pair of sensor magnets 342a and 342b described later at lower portions of the exterior walls opposite to each other in front-rear direction X with the Z axis (optical axis O) as the center.

Lens holder driving device 10 illustrated in the drawing further includes position detection part 34 that detects the position of lens holder 14 in the direction of optical axis O.

As illustrated in FIG. 2 and FIG. 4, position detection part 34 is provided in a region on a side closer to lower leaf spring 24. To be more specific, position detection part 34 includes one of the pair of sensor magnets 342a and 342b housed in the above-mentioned pair of housing parts 140a of cylindrical part 140 of lens holder 14 (in the example illustrated in the drawing, front side sensor magnet 342a), and hole sensor 344 that is inserted in rectangular hole 122a of base member 12 in such a manner as to be opposite to sensor magnet 342a.

Sensor magnets 342a and 342b are magnetized in the direction of optical axis O, and the top surface side and the bottom surface side thereof are magnetized in different polarities. In the example illustrated in the drawing, each of sensor magnets 342a and 342b is magnetized such that the top surface side is magnetized to S pole, and the bottom surface side is magnetized to N pole as illustrated in FIG. 4.

In the first embodiment, permanent magnets whose Curie point is 400° C. or above are used as sensor magnets 342a and 342b. Examples of such a permanent magnet include a samarium-cobalt magnet, a ferrite magnet, and an alnico magnet. With this configuration, thermal demagnetization of sensor magnets 342a and 342b when in use can be suppressed.

As described, in the first embodiment, driving magnets 18 and the pair of sensor magnets 342a and 342b of position detection part 30 are separated from each other. Accordingly, position detection part 34 can be prevented from being negatively influenced by the magnetic flux generated at driving magnet 18. As a result, position detection part 34 can correctly detect the position of lens holder 14 in the direction of optical axis O.

In addition, in the first embodiment, as illustrated in FIG. 3 and FIG. 4, by optimizing the polarity of two plate-shaped driving magnet pieces 182 and the polarity of the pair of sensor magnets 342a and 342b, the interference therebetween can be effectively used. To be more specific, yoke 20 itself is set to S pole when driving magnet 18 is disposed on the inner wall surface of yoke 20. When the side (upper side) of sensor magnets 342a and 342b closer to yoke 20 is set to S pole, the initial position is set by the balance with the spring force of leaf springs 22 and 24 although slight magnetic interference (repulsion direction) exists. Assuming that the upper side of sensor magnets 342a and 342b is set to N pole, the attraction with yoke 20 is large, and the initial position is unstable.

It is to be noted that the magnetic interference is small when the magnetic force of sensor magnets 342a and 342b is set to a small value. With such a configuration, however, the output of hole sensor 344 is also small, and the S/N ratio of the output of hole sensor 344 is deteriorated. Accordingly, it is desirable to dispose sensor magnets 342a and 342b at positions remote from yoke 20, and the position of hole sensor 344 is optimally set with the influence of the magnetic interference included. That is, it is desirable to dispose sensor magnets 342a and 342b at positions which are remote from yoke 20 as much as possible, and are farthest from driving magnet 18.

Further, since the pair of sensor magnets 342a and 342b are disposed at positions which are point symmetrical about optical axis O, the dynamic balance with lens holder driving device 10 can be ensured. As a result, the movable part can be vertically moved in the direction of optical axis O in a stable manner.

Furthermore, by disposing the pair of sensor magnets 342a and 342b at positions which are point symmetrical about optical axis O, the effect of the magnetic interference from the pair of sensor magnets 342a and 342b to the magnetic circuit (driving magnet 18, yoke 20) can be ensured. As a result, it also is possible to reduce the transient response time of the vertical movement of the movable part in the direction of optical axis O.

It is to be noted that the polarities of two plate-shaped driving magnet pieces 182 and the polarities of the pair of sensor magnets 342a and 342b are not limited to the polarities illustrated in FIG. 3 and FIG. 4, and may be opposite to each other. That is, plate-shaped driving magnet pieces 182 may be magnetized such that the inner periphery side is magnetized to S pole, and the outer periphery side is magnetized to N pole, and, sensor magnets 342a and 342b may be magnetized such that the top surface side is magnetized to N pole, and the bottom surface side is magnetized to S pole.

It is to be noted that, as illustrated in FIG. 2 and FIG. 4, hole sensor 344 is installed on flexible printed circuit (FPC) 40. As illustrated in FIG. 1 and FIG. 4, at front cutout part 202a of yoke 20, flexible printed circuit (FPC) 40 is attached to the exterior wall of front protruding part 122 of base member 12 in a state where it is inserted in protrusion part 207 of yoke 20. As illustrated in FIG. 1, flexible printed circuit (FPC) 40 is provided with a pair of cone-shaped depressions 401 recessed inward at both end side portions thereof in horizontal direction Y.

It is to be noted that the pair of sensor magnets 342a and 342b are respectively housed in the pair of housing parts 140a formed at lower portions of the exterior walls opposite to each other in front-rear direction X with the Z axis (optical axis O) as the center in cylindrical part 140 of lens holder 14 for the purpose of maintaining the balance between the moving state and the stopping state of lens holder 14, achieving uniform weight disposition around the Z axis (optical axis O), and equalizing the magnetic interference force (resilience) with plate-shaped driving magnet piece 182. Accordingly, assuming that one sensor magnet 342a and plate-shaped driving magnet piece 182 are separated from each other by a certain distance and that the magnetic interference has no influence, the other sensor magnet 342b that is not opposite to hole sensor 344 can be replaced by a weight having a similar weight which is not magnetized.

Upper leaf spring (front spring) 22 is disposed on the upper side (front side) of lens holder 14 in the direction of the optical axis O, and lower leaf spring (rear spring) 24 is disposed on the lower side (rear side) of lens holder 14 in the direction of optical axis O.

Figure 5:
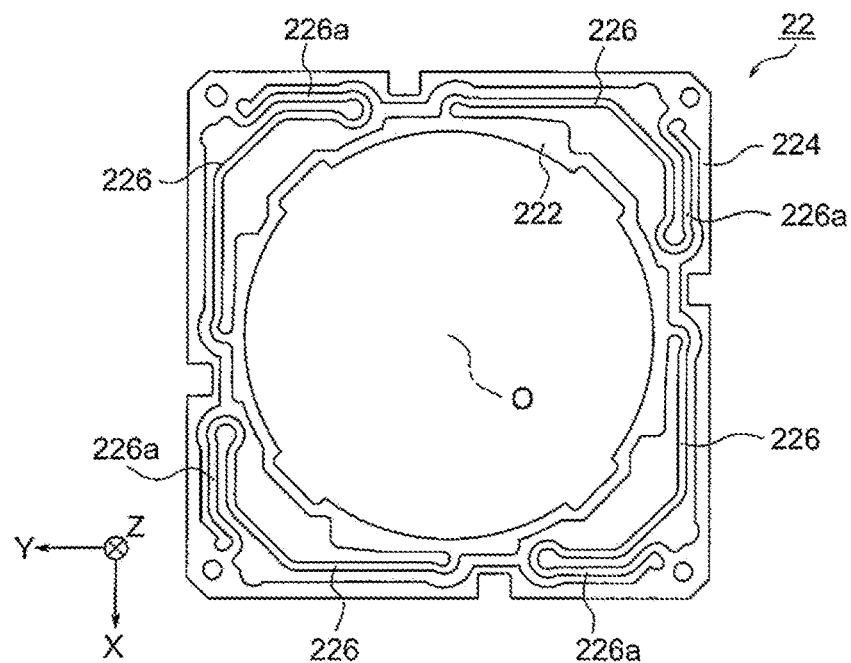
FIG. 5 is a plan view illustrating a shape of an upper leaf spring used for the lens holder driving device illustrated in FIG. 1 as viewed from a base member.
Figure 6:
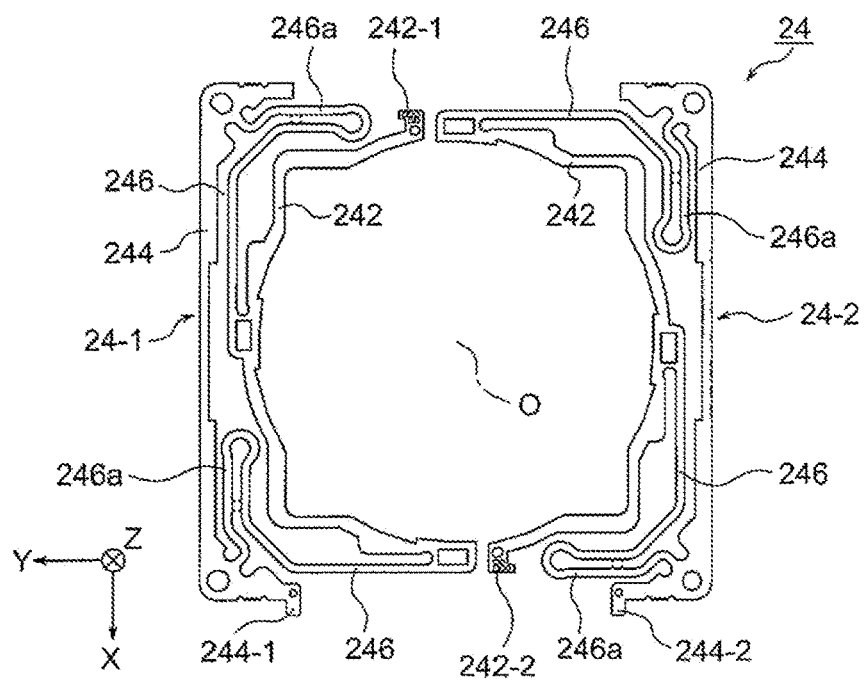
FIG. 6 is a plan view illustrating a shape of a lower leaf spring used for the lens holder driving device illustrated in FIG. 1 as viewed from base member.
Figure 7:
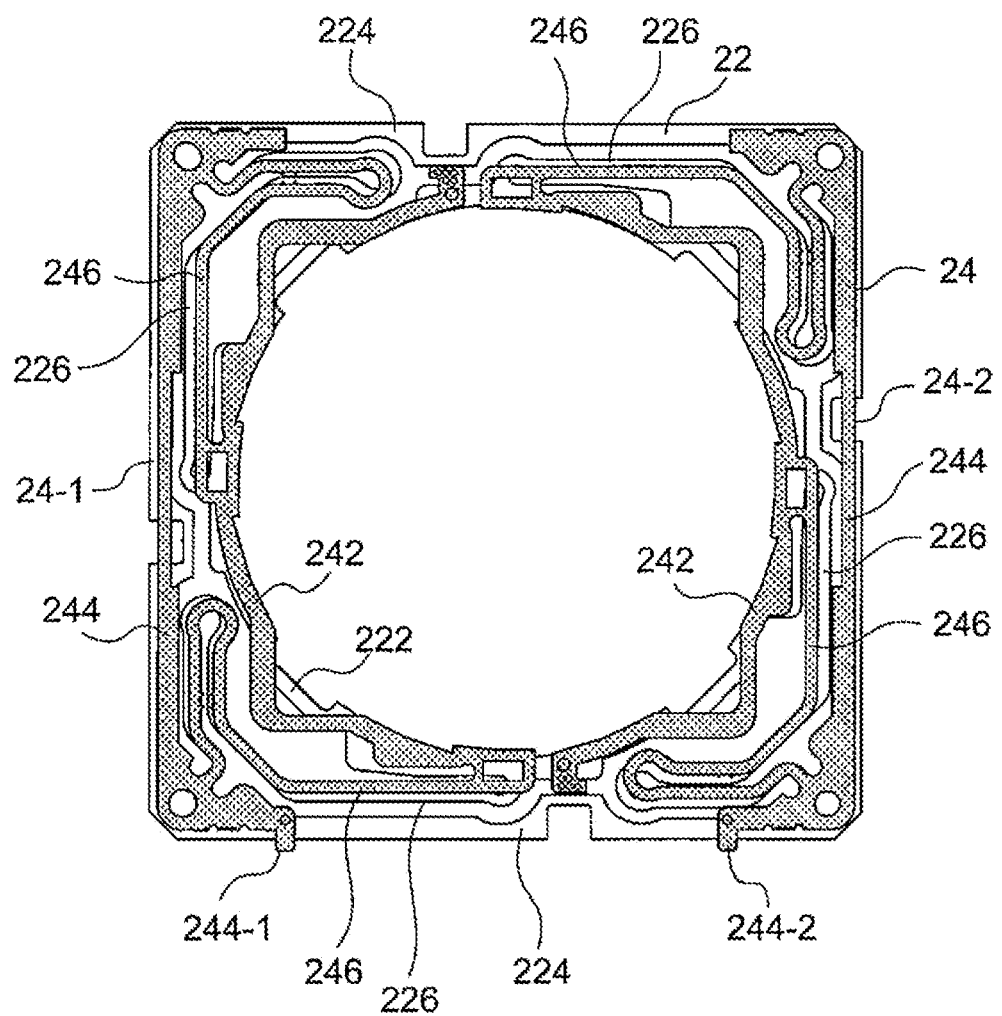
FIG. 7 is a plan view illustrating a relationship between the upper leaf spring illustrated in FIG. 5 and the lower leaf spring illustrated in FIG. 6.

With reference to FIG. 5 to FIG. 7, the shapes of upper leaf spring 22 and lower leaf spring 24 and their relationship are described.

FIG. 5 is a plan view illustrating a shape of upper leaf spring 22 as viewed from base member 12. FIG. 6 is a plan view illustrating a shape of lower leaf spring 24 as viewed from base member 12. FIG. 7 is a plan view illustrating a relationship between upper leaf spring 22 and lower leaf spring 24.

First, with reference to FIG. 5, the shape of upper leaf spring 22 is described.

Upper leaf spring 22 includes upper inner periphery end part 222 that is attached to an upper end portion of lens holder 14, and upper outer periphery end part 224 that is attached to ring-shaped part 302 of spacer 30. Four upper arm parts 226 are provided between upper inner periphery end part 222 and upper outer periphery end part 224 along the circumferential direction. Each upper arm part 226 connects upper inner periphery end part 222 and upper outer periphery end part 224. Each upper arm part 226 has a U-turn-shaped portion 226a that is folded-back by 180 degrees.

Next, with reference to FIG. 6, the shape of lower leaf spring 24 is described.

Lower leaf spring 24 includes lower inner periphery end part 242 that is attached to a lower end portion of lens holder 14, and lower outer periphery end part 244 that is attached to actuator base (base member) 12. Four lower arm parts 246 are provided between lower inner periphery end part 242 and lower outer periphery end part 244 along the circumferential direction. Each lower arm part 246 connects lower inner periphery end part 242 and lower outer periphery end part 244. Each lower arm part 246 has U-turn-shaped portion 246a that is folded-back by 180 degrees.

Next, with reference to FIG. 7, the relationship between upper leaf spring 22 and lower leaf spring 24 is described.

As illustrated in FIG. 7, four upper arm parts 226 of upper leaf spring 22 and four lower arm parts 246 of lower leaf spring 24 have substantially the same shape in plan view.

Next, the way for feeding power to driving coil 16 is described.

As illustrated in FIG. 6, for the purpose of achieving power feeding to driving coil 16 through lower leaf spring 24, lower leaf spring 24 is composed of first and second spring pieces 24-1 and 24-2 that are electrically isolated from each other. The shapes of first leaf spring piece 24-1 and second leaf spring piece 24-2 are substantially rotationally symmetrical about optical axis O of the lens.

First leaf spring piece 24-1 has first external connection terminal 244-1 protruding forward from lower outer periphery end part 244. Second leaf spring piece 24-2 has second external connection terminal 244-2 protruding forward from lower outer periphery end part 244.

On the other hand, first leaf spring piece 24-1 has first terminal part 242-1 protruding rearward from lower inner periphery end part 242. Second leaf spring piece 24-2 has second terminal part 242-2 protruding forward from lower inner periphery end part 242. First terminal part 242-1 is electrically connected to a first terminal end part (not illustrated) of driving coil 16 by soldering. Second terminal part 242-2 is electrically connected to a second terminal end part (not illustrated) of driving coil 16 by soldering.

As illustrated in FIG. 1, first and second external connection terminals 244-1 and 244-2 of lower leaf spring 24 are provided to protrude outward from the pair of cone-shaped depressions 401 of flexible printed circuit (FPC) 40.

Accordingly, flexible printed circuit (FPC) 40 is electrically connected with the first terminal end part of driving coil 16 through first external connection terminal 244-1 of lower leaf spring 24, and first leaf spring piece 24-1 and first terminal part 242-1 of lower leaf spring 24. Likewise, flexible printed circuit (FPC) 40 is electrically connected with the second terminal end part of driving coil 16 through second external connection terminal 244-2 of lower leaf spring 24, and second leaf spring piece 24-2 and second terminal part 242-2 of lower leaf spring 24.

In this manner, power is fed from flexible printed circuit (FPC) 40 to driving coil 16 through lower leaf spring 24.

When coil 16 is energized, a driving force in the direction of optical axis O is generated in lens holder 14 (lens barrel 11) with the interaction between the magnetic field of driving magnet 18 and the magnetic field of the current flowing through driving coil 16, and the driving force and the restoration force (biasing force) of the pair of leaf springs 22 and 24 are balanced, whereby the position of lens holder 14 (lens barrel 11) in the direction of optical axis O can be adjusted.

Figures 8A, 8B:
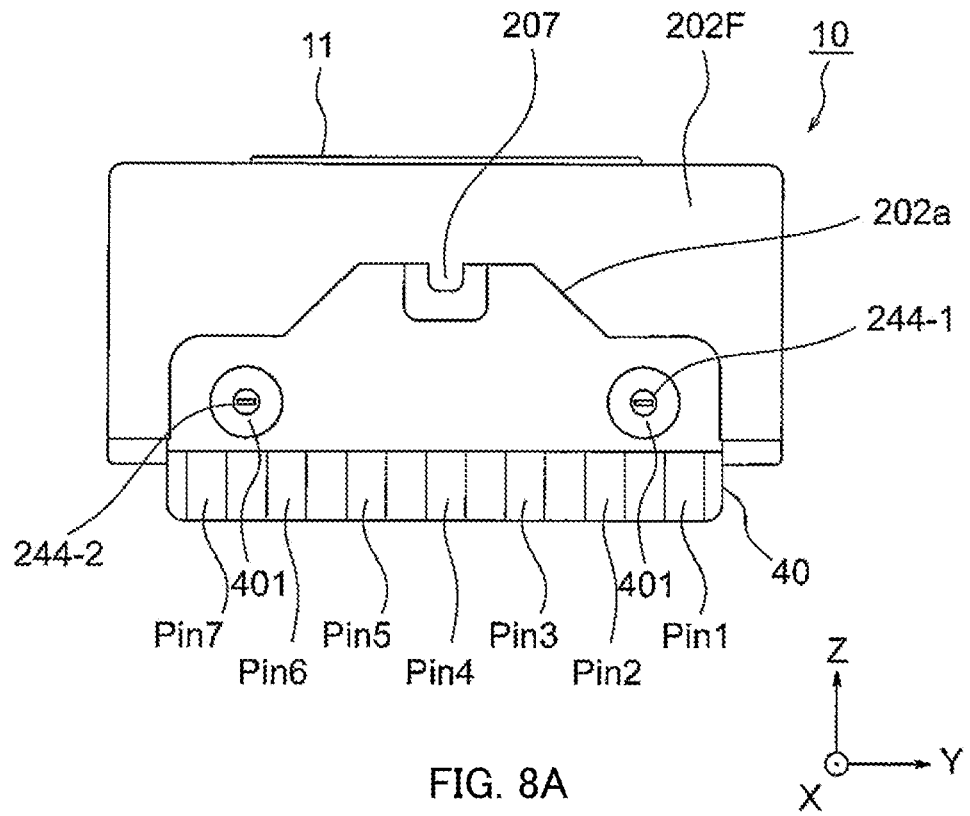
FIGS. 8A and 8B are drawings for describing a conductor pattern formed in a flexible printed circuit (FPC) used for the lens holder driving device illustrated in FIG. 1, FIG. 8A being a front view of the lens holder driving device.

With reference to FIGS. 8A and 8B, the conductor pattern of the terminal part formed in flexible printed circuit (FPC) 40 is described. FIG. 8A is a front view of lens holder driving device 10, and FIG. 8B illustrates a relationship between seven terminals of the conductor pattern of flexible printed circuit (FPC) 40 and terminals which are connected to the seven terminals.

As illustrated in FIG. 8A, flexible printed circuit (FPC) 40 includes, as the conductor pattern, first to seventh terminals Pin1 to Pin7 which are disposed from the right side to the left side.

As illustrated in FIG. 8B, first terminal Pin1 is connected with ACT Terminal (+) that is first external connection terminal 244-1 of lower leaf spring 24, second terminal Pin2 is connected with first output terminal Hall output (?) of hole sensor 344, and third terminal Pin3 is connected with first input terminal Hall input (+) of hole sensor 344. Fourth terminal Pin4 is connected with ground terminal GND. Fifth terminal Pin5 is connected with second output terminal Hall output (+) of hole sensor 344, sixth terminal Pin6 is connected with first input terminal Hall input (?) of Hall device 344, and seventh terminal Pin7 is connected with ACT Terminal (?) that is second external connection terminal 244-2 of lower leaf spring 24.

Next, with reference to FIG. 9 to FIG. 12, details of the configuration of lower leaf spring 24 are described.

Figure 9:
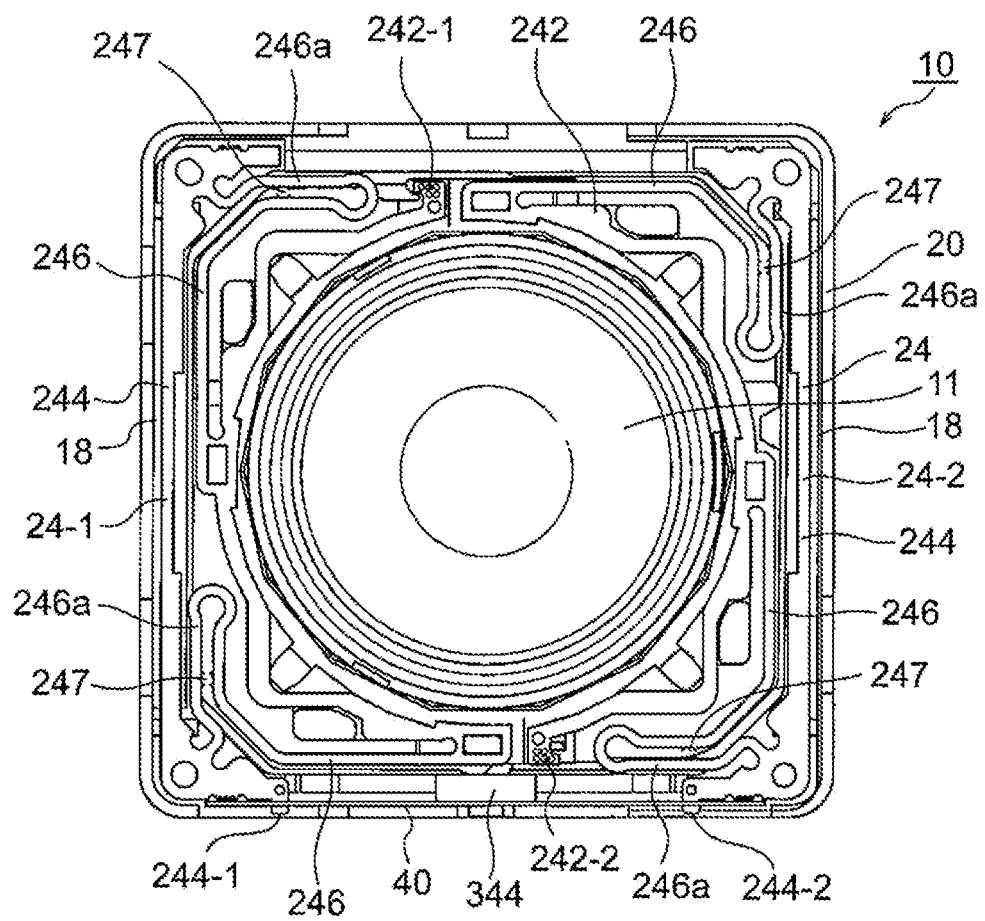
FIG. 9 is a plan view illustrating an assembly of the lens holder driving device illustrated in FIG. 1 as viewed from the base member, and illustrates a state before an elastic adhesive agent is provided (applied) to the lower leaf spring.
Figure 9:
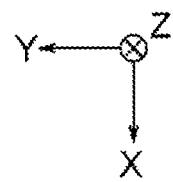
Figure 10:
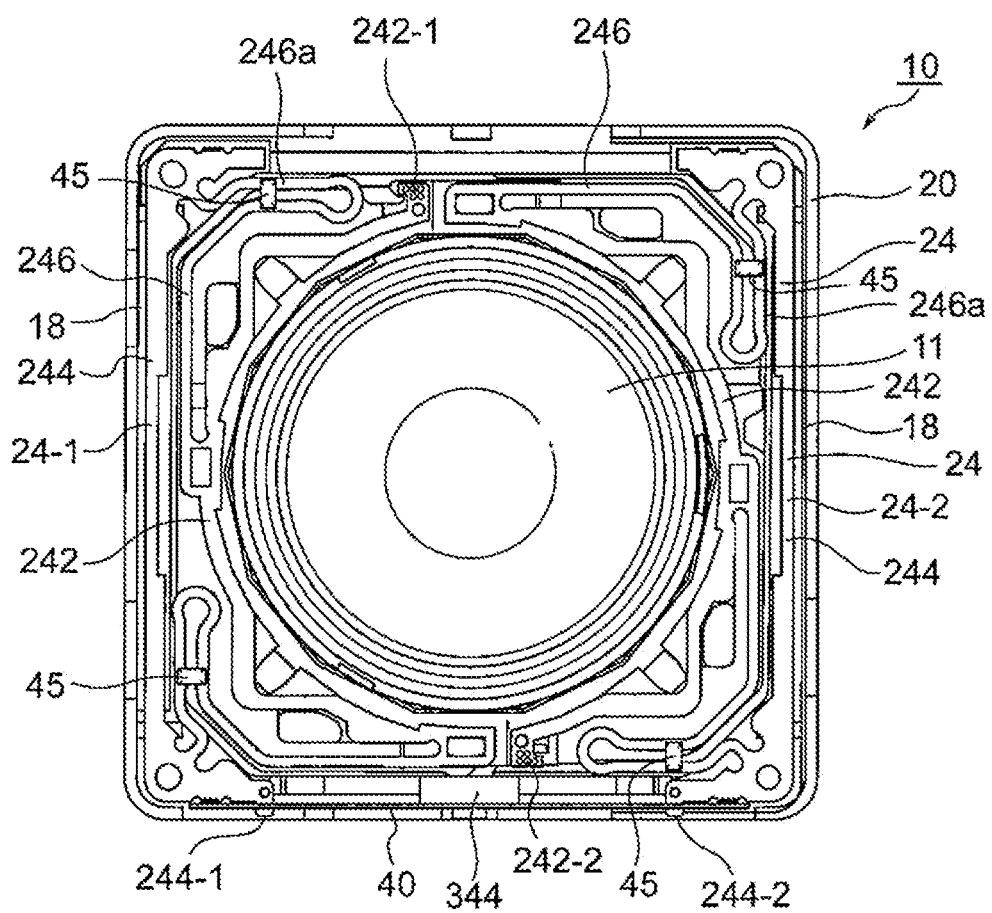
FIG. 10 is a plan view illustrating the assembly of the lens holder driving device illustrated in FIG. 1 as viewed from the base member, and illustrates a state after the elastic adhesive agent is provided (applied) to the lower leaf spring.
Figure 11:
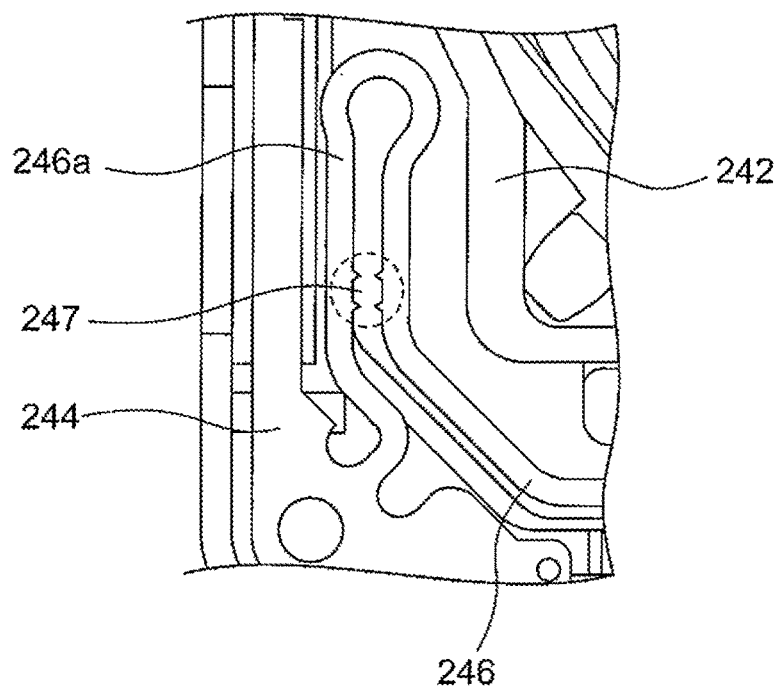
FIG. 11 is a partially enlarged view illustrating a part of FIG. 9 in an enlarged manner.

FIG. 9 and FIG. 10 are plan views of the assembly of lens holder driving device 10 as viewed from base member 12. FIG. 9 illustrates a state before elastic adhesive agent 45 described later is provided (applied) to lower leaf spring 24, and FIG. 10 illustrates a state after elastic adhesive agents 45 is provided (applied) to lower leaf spring 24. FIG. 11 is a partially enlarged view illustrating a part of FIG. 9 in an enlarged manner, and FIG. 12 is a partially enlarged view illustrating a part of FIG. 10 in an enlarged manner.

Figure 12:
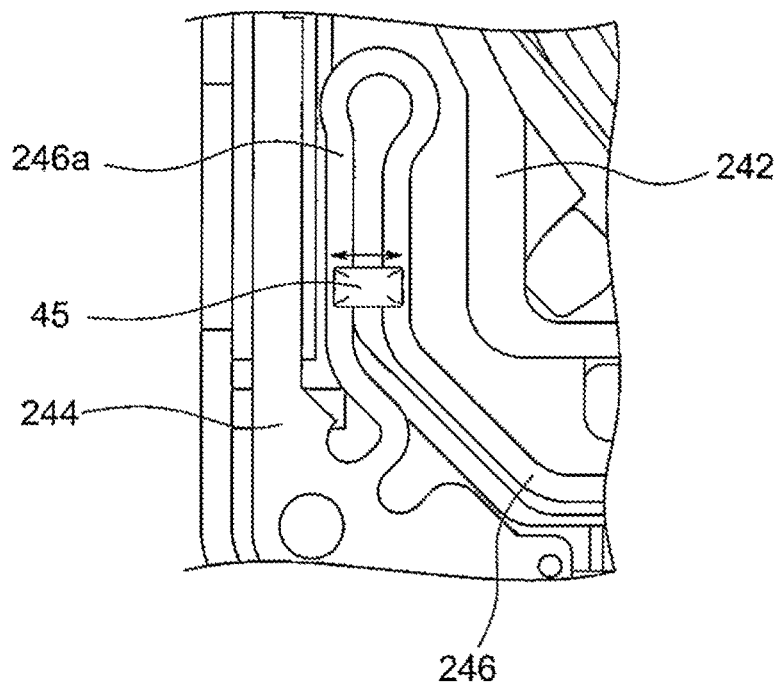
FIG. 12 is a partially enlarged view illustrating a part of FIG. 10 in an enlarged manner.

As illustrated in FIG. 10 and FIG. 12, lower leaf spring 24 is provided with elastic adhesive agents 45 at U-turn-shaped portions 246a of four lower arm parts 246. Each elastic adhesive agent 45 is provided as a bridge between opposite portions of U-turn-shaped portion 246a. Four elastic adhesive agents 45 are provided at equal angular intervals in the circumferential direction around optical axis O.

It is to be noted that elastic adhesive agent 45 is composed of a stretchable and flexible resin. In this example, as elastic adhesive agent 45, a moisture-curable adhesive agent selected from among silicone-based adhesive agent and silyl group terminated polymer-based adhesive agent is used.

As illustrated in FIG. 9 and FIG. 11, U-turn-shaped portions 246a of four lower arm parts 246 have positioning protrusions 247 for facilitating the bridging of elastic adhesive agent 45 with its surface tension at the above-mentioned opposite portions (that is, the portions where elastic adhesive agent 45 is applied).

By applying elastic adhesive agent 45 at U-turn-shaped portions 246a of four lower arm parts 246 in the above-mentioned manner, lens holder driving device 10 according to the present embodiment suppresses the secondary resonance (sub resonance) which is sway in the arrow direction of FIG. 12. In addition, elastic adhesive agent 45 is provided at U-turn-shaped portions 246a of four lower arm parts 246, and therefore does not limit the original stroke of lens holder 14.

It is to be noted that elastic adhesive agent 45 can provide its function with no problem even when washing solution is present. Accordingly, as usual, lens holder driving device 10 can be washed after lens holder driving device 10 is assembled and the quality can be maintained.

In addition, while stretchable and flexible resin is provided to lower leaf spring 24 by applying elastic adhesive agent 45 in this example, the present invention is not limited to this. For example, the stretchable and flexible resin may be provided to lower leaf spring 24 by bonding an elasticity sheet of such a stretchable and flexible resin to lower leaf spring 24 with a double-sided tape. Alternatively, the stretchable and flexible resin may be provided to lower leaf spring 24 by molding lower leaf spring 24 and stretchable and flexible resin in two colors by outsert molding. Further, stretchable and flexible resin may also be provided to lower leaf spring 24 by UV curing a photoresist. In addition, the place where the stretchable and flexible resin is provided is not limited to lower leaf spring 24, and it is also effective to provide the stretchable and flexible resin at upper leaf spring 22 or both of leaf springs 22 and 24.

Next, with reference to FIG. 13 to FIG. 16, front cutout part (first cutout part) 202a and rear cutout part (second cutout part) 202b formed in yoke 20 are described.

Figure 13:
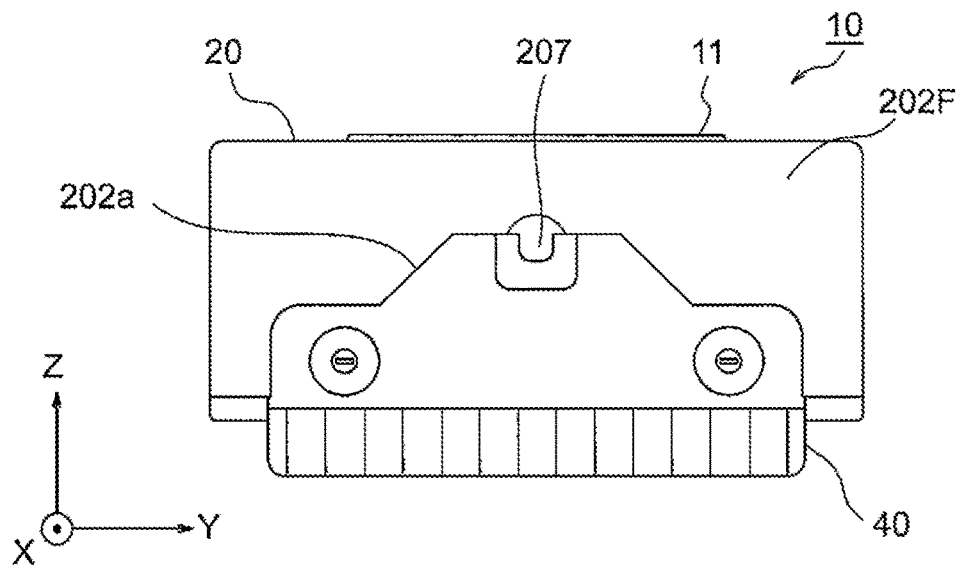
FIG. 13 is a front view of the lens holder driving device illustrated in FIG. 1.
Figure 14:
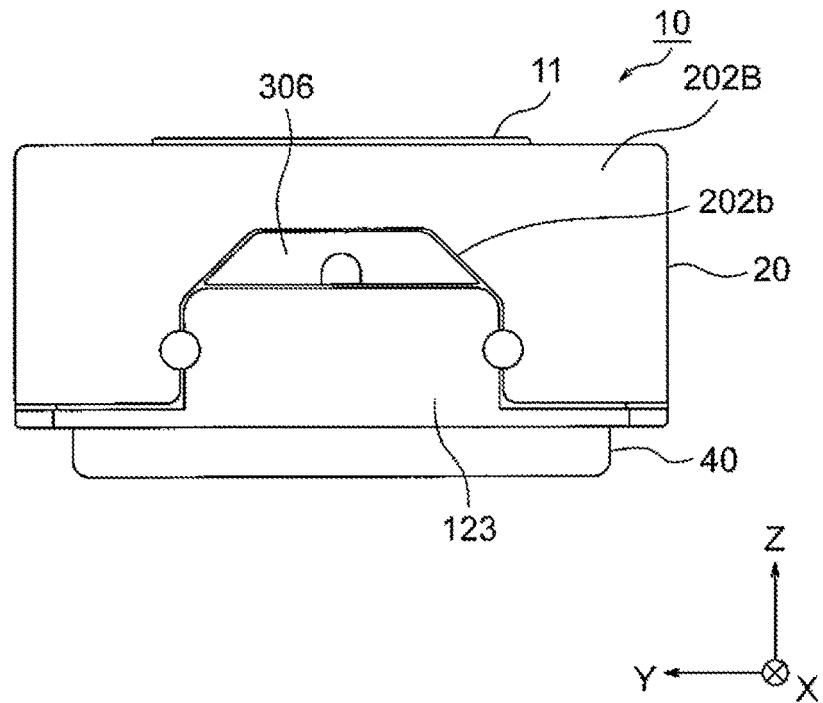
FIG. 14 is a back view of the lens holder driving device illustrated in FIG. 1.
Figure 15:
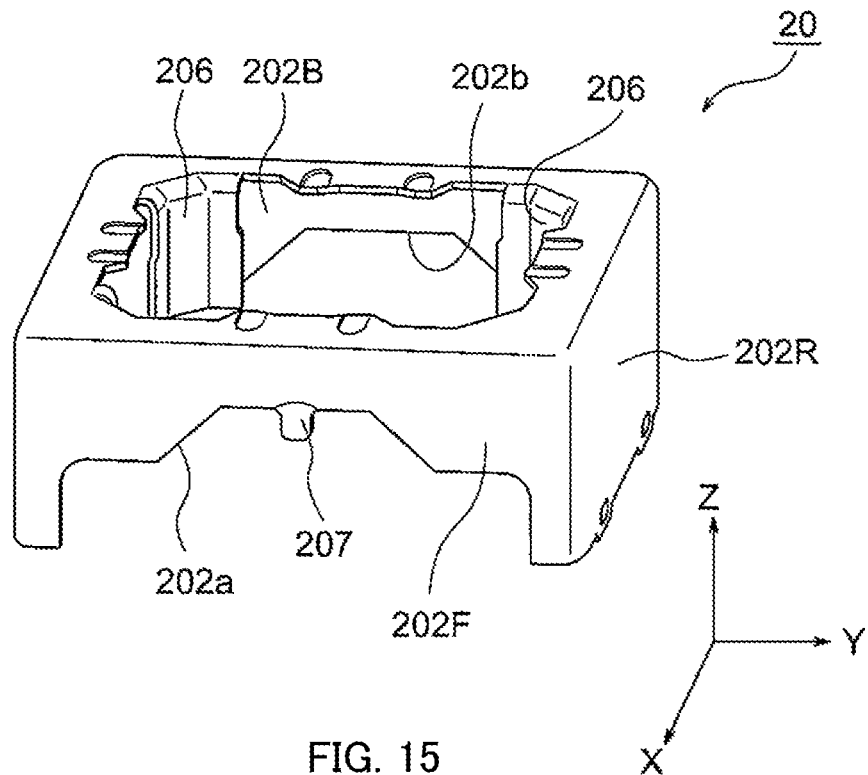
FIG. 15 is a perspective view of a yoke used for the lens holder driving device illustrated in FIG. 1.
Figure 16:
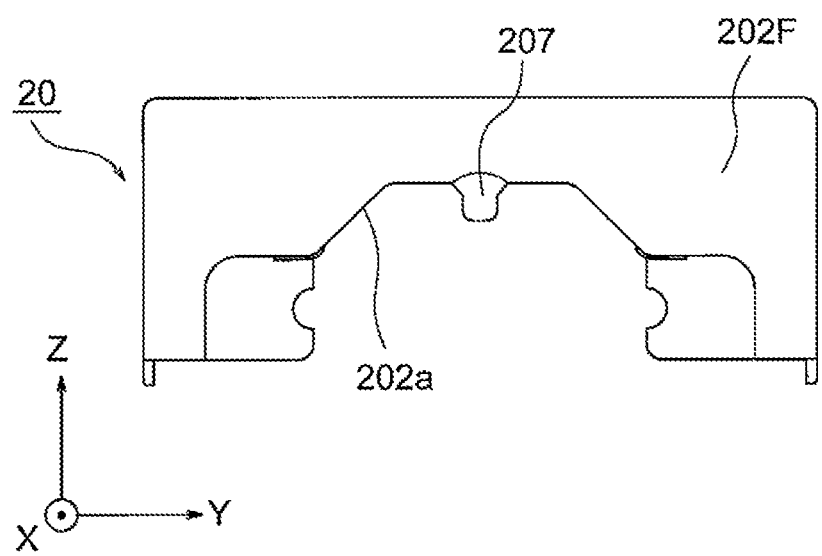
FIG. 16 is a front view of the yoke used for the lens holder driving device illustrated in FIG. 1.

FIG. 13 is a front view of lens holder driving device 10, and FIG. 14 is a back view of lens holder driving device 10. FIG. 15 is a perspective view of yoke 20, and FIG. 16 is a front view of yoke 20.

Front plate part (first plate part) 202F of yoke 20 has front cutout part (first cutout part) 202a having a trapezoidal shape, and likewise, rear plate part (second plate part) 202B has rear cutout part (second cutout part) 202b having a trapezoidal shape.

By employing yoke 20 of the above-mentioned structure, the pair of sensor magnets 342a and 342b (see FIG. 2) is prevented from being negatively influenced by the magnetic field generated by a magnetic circuit composed of yoke 20 and driving magnet 18. In other words, the influence of magnetic field of the above-mentioned magnetic circuit on the pair of sensor magnets 342a and 342b can be equalized, and, reduced as much as possible. As a result, it is possible to suppress the non-uniformity of the thrust by the stroke amount of the movable part (lens barrel 11 and lens holder 14).

Next, with reference to FIG. 17 to FIG. 21, a structure in which base member 12 and yoke 20 are fitted together through spacer (inner housing) 30 is described.

Figure 17:
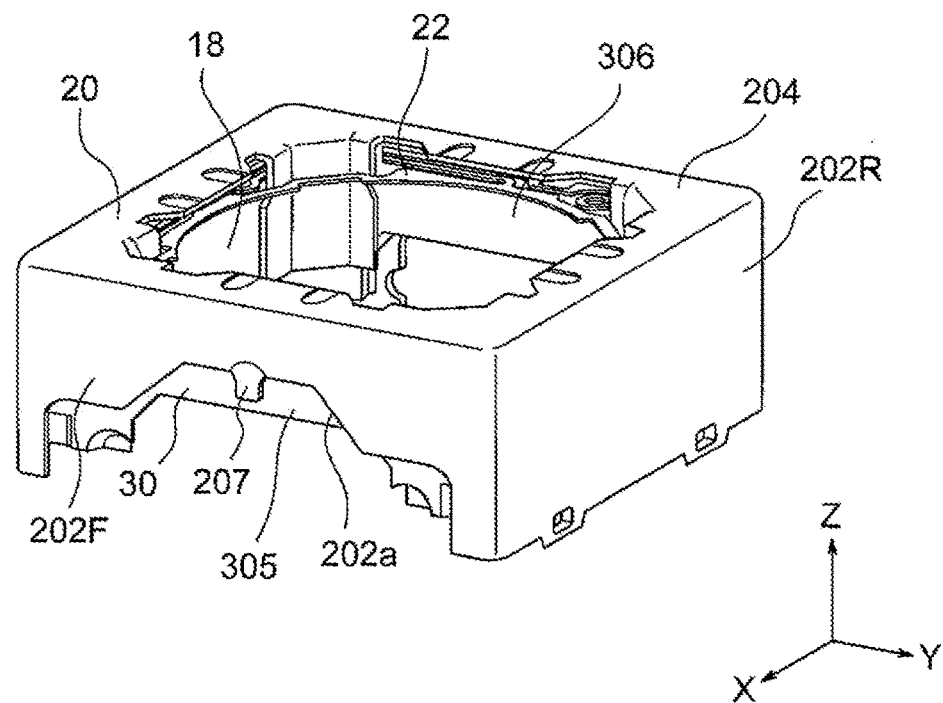
FIG. 17 is a perspective view illustrating an assembly in which a spacer (inner housing), a driving magnet and an upper leaf spring are installed to the yoke in the lens holder driving device illustrated in FIG. 1.
Figure 18:
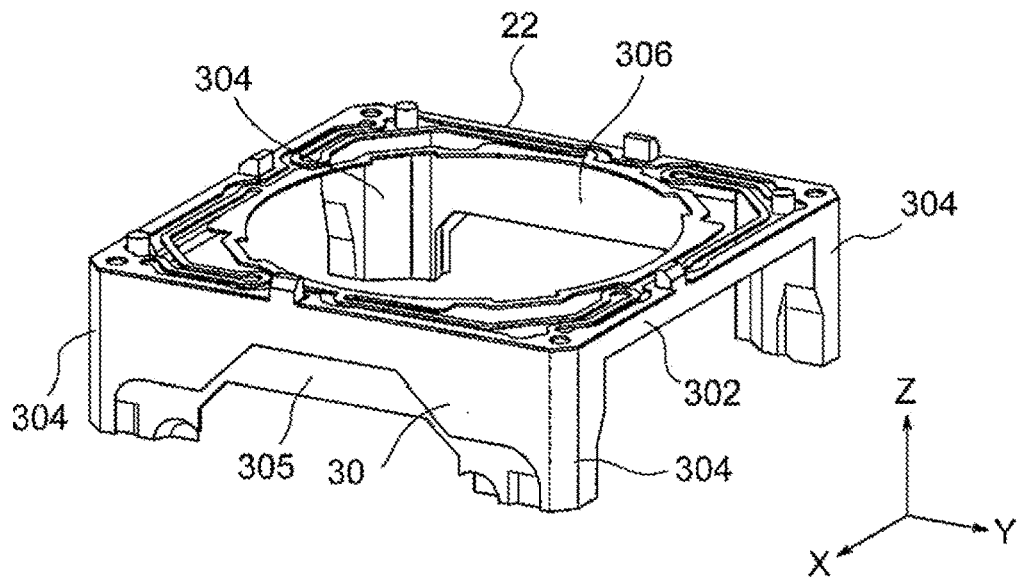
FIG. 18 is a perspective view illustrating an assembly in which the upper leaf spring is installed to the spacer (inner housing) in the lens holder driving device illustrated in FIG. 1.
Figure 19:
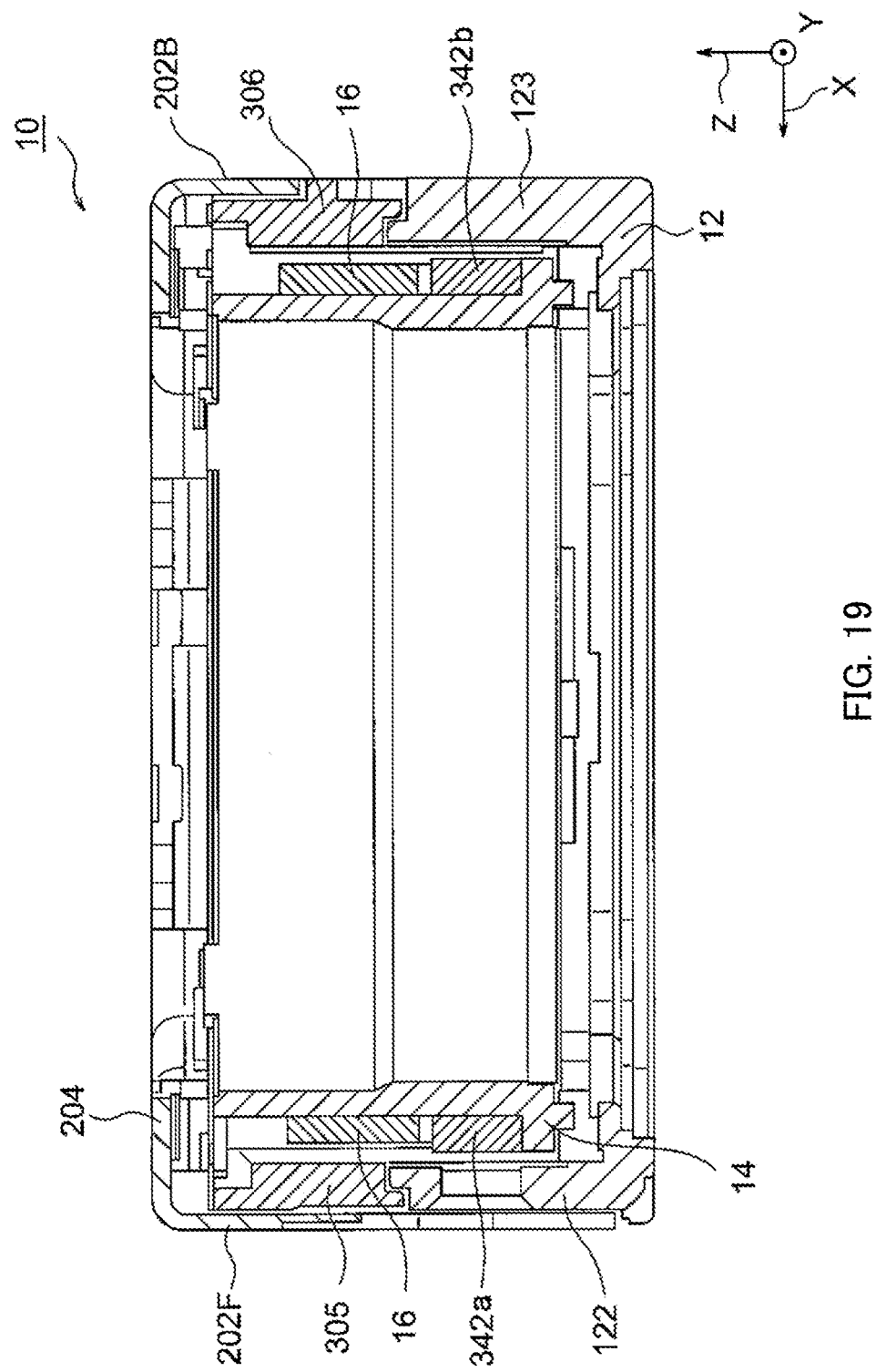
FIG. 19 is a longitudinal sectional view taken along the line IV-IV of FIG. 1.
Figure 20:
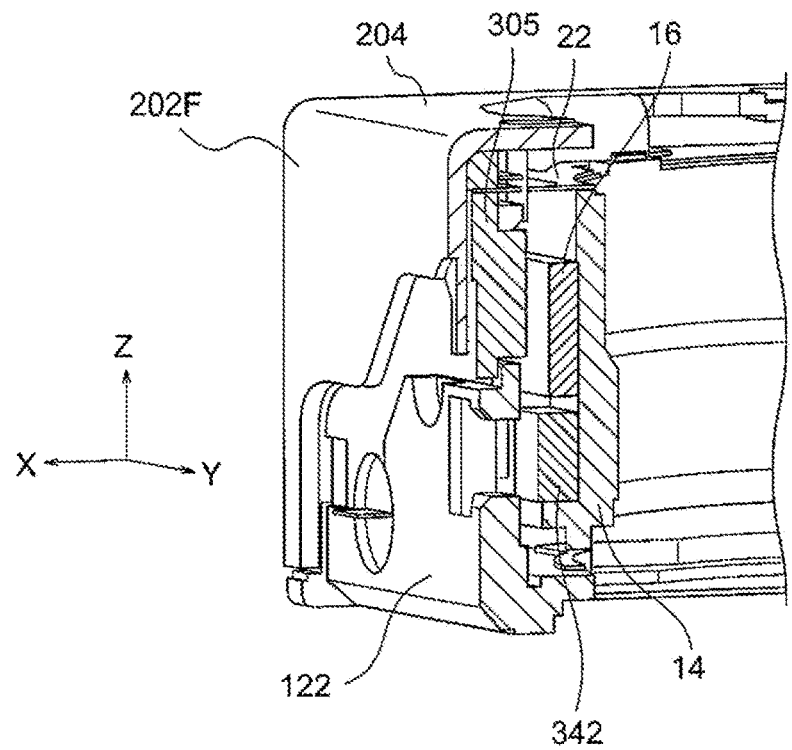
FIG. 20 is a cross-sectional perspective view specifically illustrating a part of (front side) a cross-section of FIG. 19.
Figure 21:
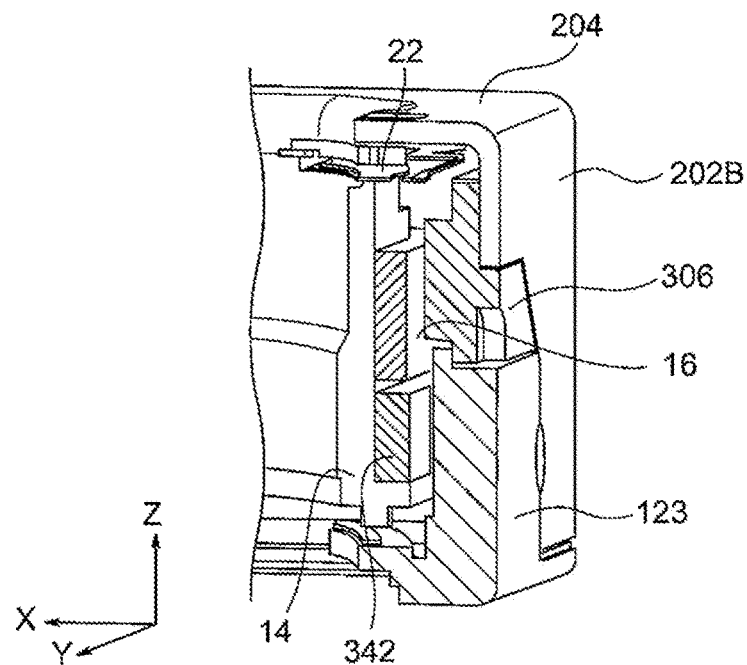
FIG. 21 is a cross-sectional perspective view specifically illustrating a part (rear side) of the cross-section of FIG. 19.

FIG. 17 is a perspective view illustrating an assembly in which spacer (inner housing) 30, driving magnet 18 and upper leaf spring 22 are installed in yoke 20. FIG. 18 is a perspective view illustrating an assembly in which upper leaf spring 22 is installed to spacer (inner housing) 30. FIG. 19 is a longitudinal sectional view taken along the line IV-IV of FIG. 1. FIG. 20 is a cross-sectional perspective view specifically illustrating a part (front side) of the cross-section of FIG. 19, and FIG. 21 is a cross-sectional perspective view specifically illustrating a part (rear side) of the cross-section of FIG. 19.

After upper leaf spring 22 is mounted on spacer (inner housing) 30 as illustrated in FIG. 18, spacer (inner housing) 30 is installed along the inner wall of yoke 20 as illustrated in FIG. 17.

In addition, as illustrated in FIG. 19, spacer (inner housing) 30 is fitted with base member 12. At this time, as illustrated in FIG. 20, in a region around front cutout part (first cutout part) 202a of yoke 20, front protruding part (first protruding part) 122 of base member 12 and front U-shaped plate part (first U-shaped plate part) 305 of spacer (inner housing) 30 are engaged with each other (in engagement). In addition, as illustrated in FIG. 21, in a region around rear cutout part (second cutout part) 202b of yoke 20, rear protruding part (second protruding part) 123 of base member 12 and rear U-shaped plate part (second U-shaped plate part) 306 of spacer (inner housing) 30 are engaged with each other (in engagement).

In addition, by supplying adhesive resin (adhesive agent) by utilizing capillarity to the above-mentioned engaging portion (engagement portion), the gap of the above-mentioned engaging portion (engagement portion) is closed. In this manner, it is possible to prevent dusts and foreign matters from intruding into lens holder driving device 10 from the outside through the gap.

Thus, the combination of first protruding part 122, second protruding part 123, and inner housing 30 serves as a foreign matter intrusion prevention member that prevents foreign matters from intruding into the inside from first and second cutout parts 202a and 202b of first and second plate parts 202F and 202B.

Figure 22:
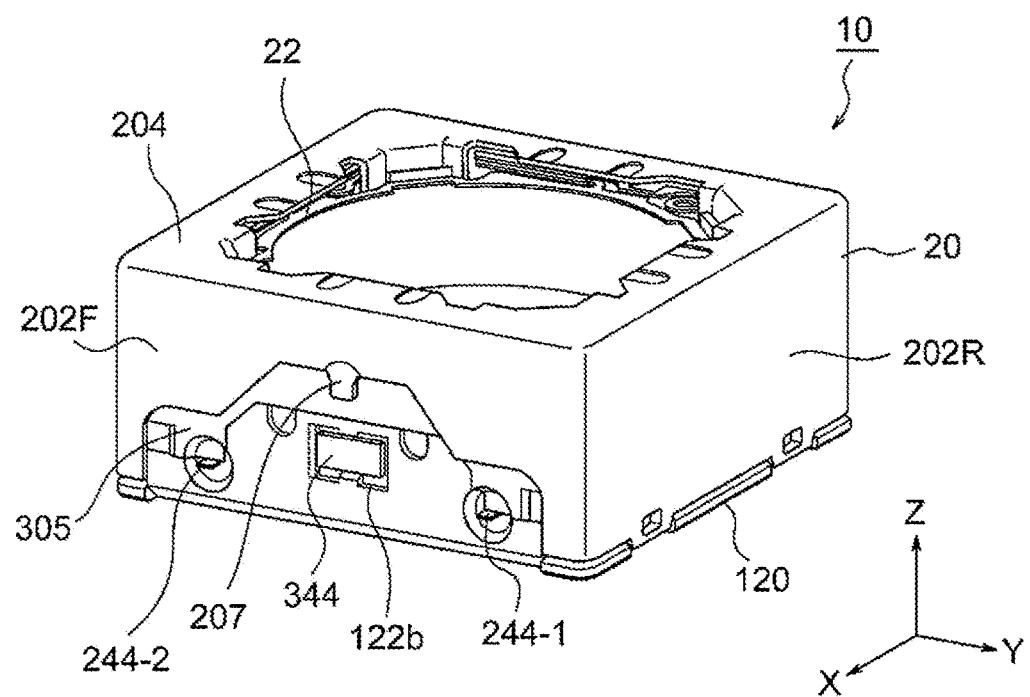
FIG. 22 is a perspective view of the lens holder driving device illustrated in FIG. 1 in which a flexible printed circuit (FPC) is omitted.

Next, with reference to FIG. 22, a state where hole sensor (magnetic detection device) 344 is attached on base member 12 is described.

FIG. 22 is a perspective view illustrating lens holder driving device 10 illustrated in FIG. 1 in which flexible printed circuit (FPC) 40 is omitted.

As illustrated in FIG. 2 and FIG. 22, hole sensor 344 is inserted to rectangular hole 122a formed in front protruding part (first protruding part) 122 of base member 12. In this manner, the position of hole sensor 344 is set. In addition, in front protruding part 122 of base member 12, C plane 122b is provided around rectangular hole 122a. Resin such as epoxy resin (adhesive agent) is applied to C plane 122b to close the gap between hole sensor 344 and rectangular hole 122a, and thus lens holder driving device 10 has an enclosed structure.

With this structure, the position of hole sensor 344 is stabilized at a position, and non-uniformity of the output of hole sensor 344 can be suppressed. In addition, since resin (adhesive agent) is supplied into the gap between hole sensor 344 and base member 12, rectangular hole 122a is closed. As a result, it is possible to prevent intrusion of foreign matters and the like through rectangular hole 122a.

With reference to FIG. 23A to FIG. 24B, a configuration of flexible printed circuit (FPC) 40 is described.

Figure 23A:
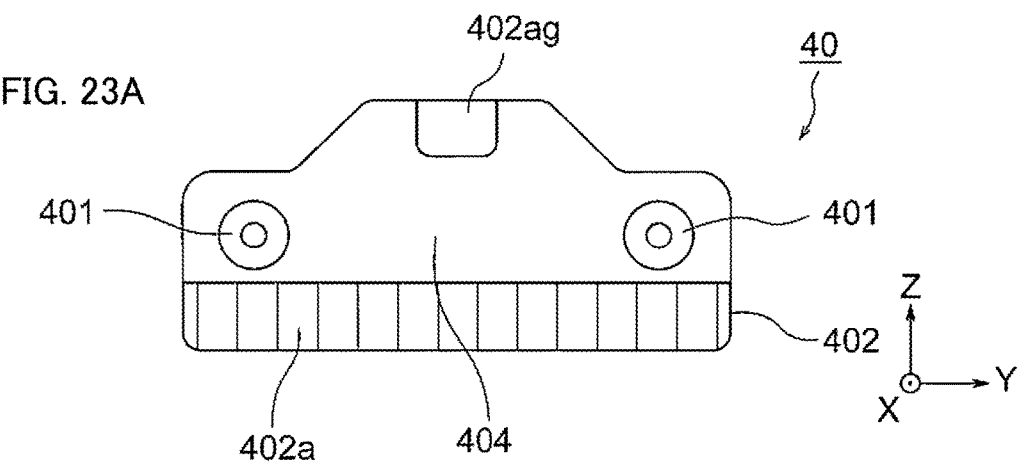
FIG. 23A is a front view illustrating the flexible printed circuit (FPC) used for the lens holder driving device illustrated in FIG. 1.
Figure 23B:
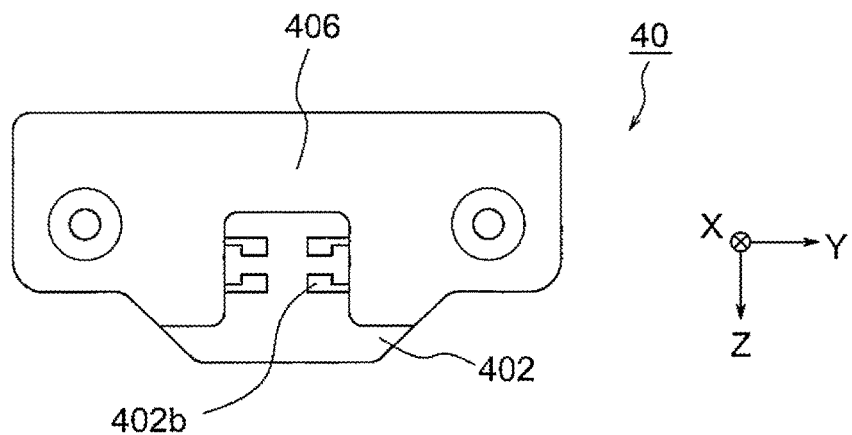
FIG. 23B is a back view illustrating the flexible printed circuit (FPC) used for the lens holder driving device illustrated in FIG. 1.
Figure 23C:
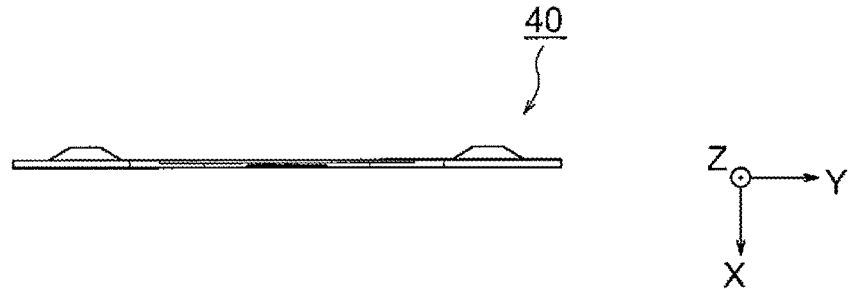
FIG. 23C is a plan view (top view) illustrating the flexible printed circuit (FPC) used for the lens holder driving device illustrated in FIG. 1.
Figure 24A:
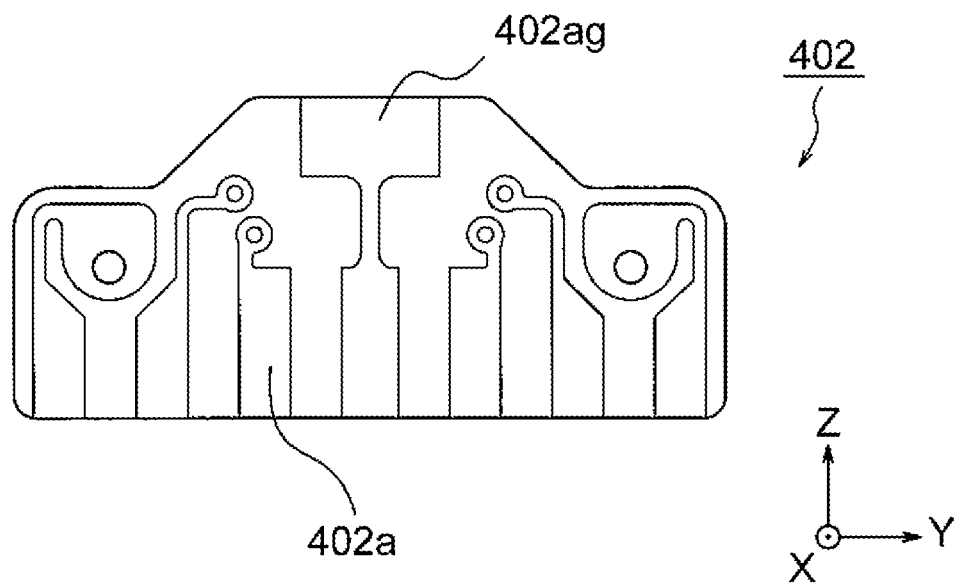
FIG. 24A is a front view illustrating a base material of flexible printed circuit (FPC) illustrated in FIG. 23A.
Figure 24B:
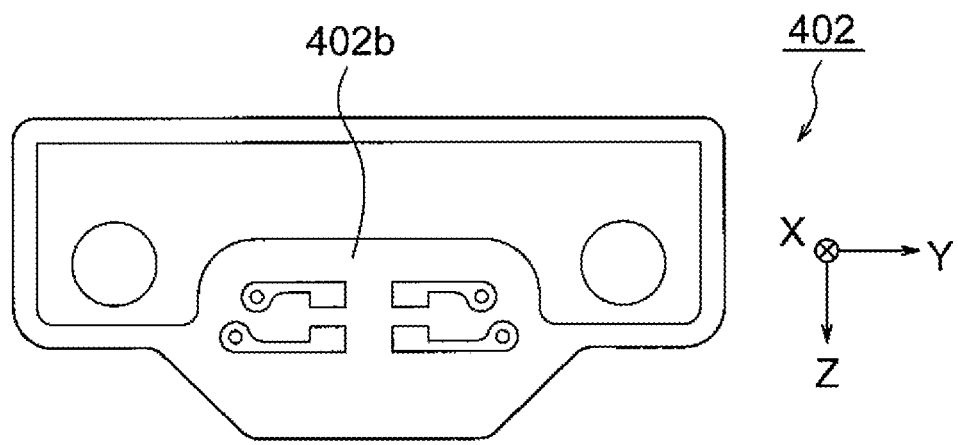
FIG. 24B is a back view illustrating the base material of the flexible printed circuit (FPC) illustrated in FIG. 23B.

FIG. 23A to FIG. 23C are a front view, a rear view, and a plan view (top view) of flexible printed circuit (FPC) 40, respectively. FIG. 24A and FIG. 24B are a front view and a rear view of base material 402 of flexible printed circuit (FPC) 40, respectively.

Flexible printed circuit (FPC) 40 is composed of base material 402, first cover film 404, and second cover film 406.

As illustrated in FIG. 24A, first conductor pattern 402a is formed on the main surface of base material 402. First conductor pattern 402a includes grounding pattern 402ag at a center portion thereof. As illustrated in FIG. 24B, second conductor pattern 402b is formed on the rear surface of base material 402. Second conductor pattern 402b is intended for connection of the four terminals of hole sensor 344. In the example illustrated in the drawing, first and second conductor patterns 402a and 402b are composed of a Cu pattern.

As illustrated in FIG. 23A, first cover film 404 is bonded on the main surface of base material 402 so as to cover a part of first conductor pattern 402a. First cover film 404 is composed of a black cover film (light shielding film) that blocks light.

As illustrated in FIG. 23B, second cover film 406 is bonded on the rear surface of base material 402 so as to cover a part of second conductor pattern 402b.

With reference FIG. 25A to FIG. 25E, a state where hole sensor 344 is installed on flexible printed circuit (FPC) 40 is described. FIG. 25A to FIG. 25E are a front view of, a rear view, a plan view (top view), a perspective view as viewed from the front surface side, and a perspective view as viewed from the back side of the state where hole sensor 344 is installed on flexible printed circuit (FPC) 40, respectively.

Figure 25A:
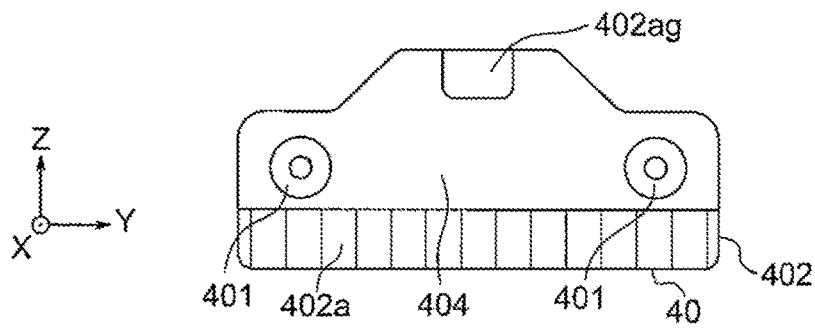
FIG. 25A is a front view illustrating a state where a hole sensor is installed to the flexible printed circuit (FPC) in the lens holder driving device illustrated in FIG. 1.
Figure 25B:
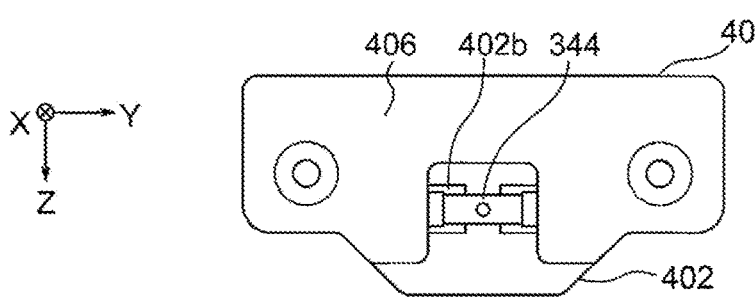
FIG. 25B is a back view illustrating a state where the hole sensor is installed to the flexible printed circuit (FPC) in the lens holder driving device illustrated in FIG. 1.
Figure 25C:
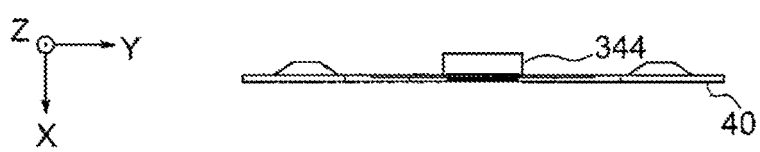
FIG. 25C is a plan view illustrating (top view) a state where the hole sensor is installed to the flexible printed circuit (FPC) in the lens holder driving device illustrated in FIG. 1.
Figure 25D:
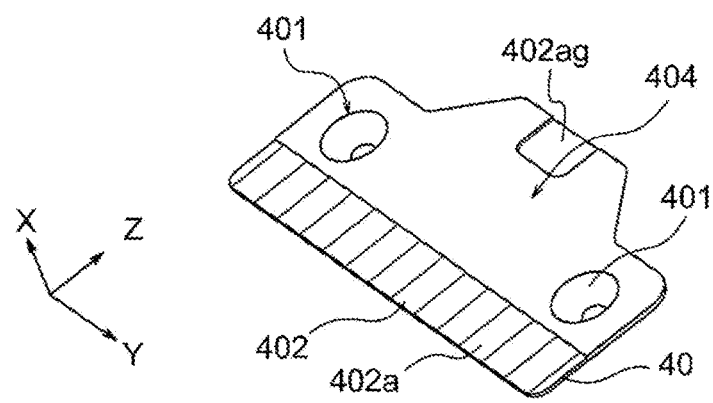
FIG. 25D is a perspective view as viewed from the front surface side illustrating a state where the hole sensor is installed to the flexible printed circuit (FPC)
Figure 25E:
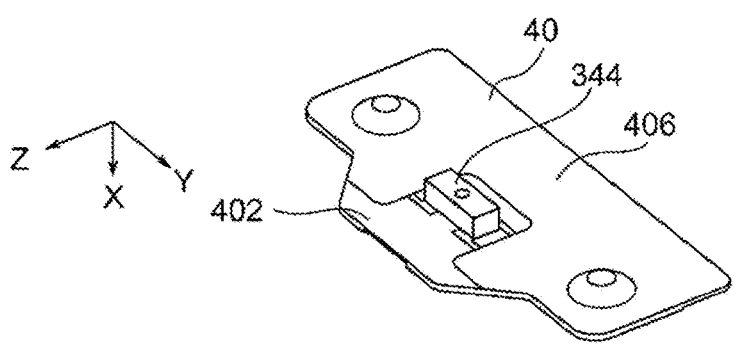
FIG. 25E is a perspective view as viewed from the back side illustrating a state where the hole sensor is installed to the flexible printed circuit (FPC) in the lens holder driving device illustrated in FIG. 1.

As illustrated in FIG. 25B and FIG. 25E, hole sensor 344 is joined to second conductor pattern 402b by soldering on the rear surface (back surface) side of flexible printed circuit (FPC) 40.

Accordingly, as illustrated in FIG. 25A and FIG. 25D, black cover film (light shielding film) 404 is bonded on the main surface of flexible printed circuit (FPC) 40 which is opposite to the rear surface on which hole sensor 344 is attached. In this manner, it is possible to prevent intrusion of light (stray light) into lens holder driving device 10 through the gap between hole sensor 344 and rectangular hole 122a (see FIG. 2) of base member 12.

Figure 26:
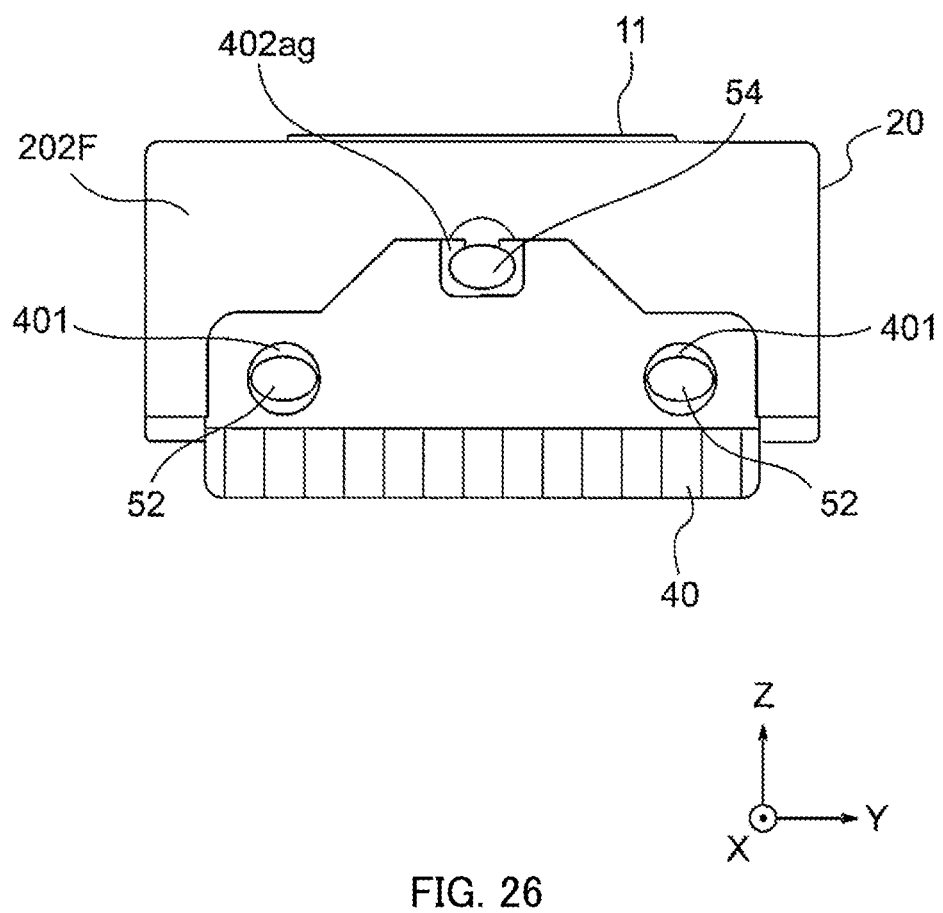
FIG. 26 is a plan view that illustrates the lens holder driving device illustrated in FIG. 1 and a connection state of the flexible printed circuit (FPC)
Figure 27:
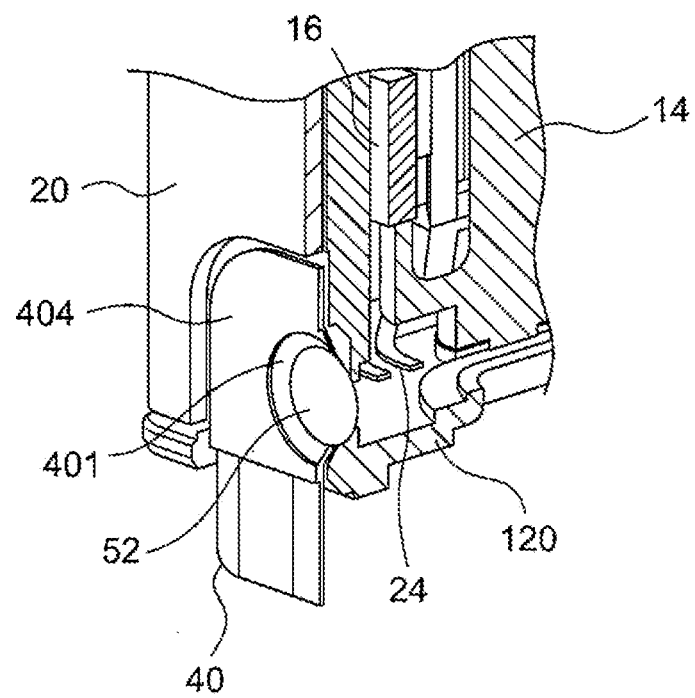
FIG. 27 is a partially enlarged cross-sectional perspective view illustrating a region around cone-shaped depressions of the flexible printed circuit (FPC) of FIG. 26 in an enlarged manner.
Figure 28:
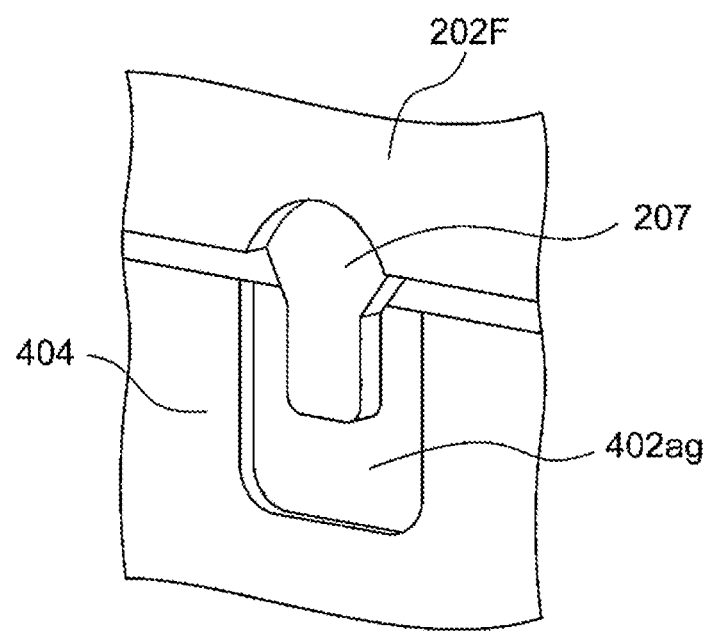
FIG. 28 is a partially enlarged perspective view illustrating a region around a protrusion part of the yoke of FIG. 26 in an enlarged manner.

Next, with reference to FIG. 26 to FIG. 28, electric connection of flexible printed circuit (FPC) 40, yoke 20, and first and second external connection terminals 244-1 and 244-2 of lower leaf spring 24 is described.

FIG. 26 is a plan view of lens holder driving device 10 illustrating a connection state of flexible printed circuit (FPC) 40. FIG. 27 is a partially enlarged perspective cross-sectional view illustrating a region around cone-shaped depression 401 of flexible printed circuit (FPC) 40 of FIG. 26 in an enlarged manner. FIG. 28 is a partially enlarged perspective view illustrating a region around protrusion part 207 of yoke 20 of FIG. 26 in an enlarged manner.

As described above, flexible printed circuit (FPC) 40 is provided with a pair of cone-shaped depressions 401 at both end portions in horizontal direction (first direction) Y. In addition, first and second external connection terminals 244-1 and 244-2 of lower leaf spring 24 are provided to protrude outward from the pair of cone-shaped depressions 401 of flexible printed board (FPC) 40. Here, first and second external connection terminals 244-1 and 244-2 of lower leaf spring 24 (see FIG. 6) protrude in the pair of cone-shaped depressions 401 without protruding over the main surface of flexible printed circuit (FPC) 40.

As illustrated in FIG. 26 and FIG. 27, first and second external connection terminals 244-1 and 244-2 (see FIG. 6) of lower leaf spring 24 are joined to the pair of cone-shaped depressions 401 of flexible printed circuit (FPC) 40 with solder 52. Thus, a large joint area can be achieved.

In addition, as described above, flexible printed circuit (FPC) 40 is attached on the exterior wall of front protruding part (first protruding part) 122 of base member 12 at front cutout part (first cutout part) 202a of yoke 20 in a state where it is inserted to protrusion part 207 of yoke 20. Protrusion part 207 is Sn-plated.

As illustrated in FIG. 26 and FIG. 28, at protrusion part 207, yoke 20 and grounding pattern 402ag of flexible printed circuit (FPC) 40 are joined together with solder 54 so as to be conductive.

With this structure, the resistance value of grounding pattern 402ag can be suppressed to a minimum value, and peel-off of flexible printed circuit (FPC) 40 can be prevented.

In addition, as illustrated in FIG. 28, a part of protrusion part 207 of yoke 20 is half-punched.

Accordingly, flexible printed circuit (FPC) 40 is coupled with base member 12 and spacer (inner housing) 30 with solders 52 and 54 at three positions. As a result, the strength of flexible printed circuit (FPC) 40 can be reinforced. In this manner, peel-off of flexible printed circuit (FPC) 40 can be prevented. In addition, since protrusion part 207 of yoke 20 is half-punched, projecting of solder 54 can be suppressed.

Figure 29:
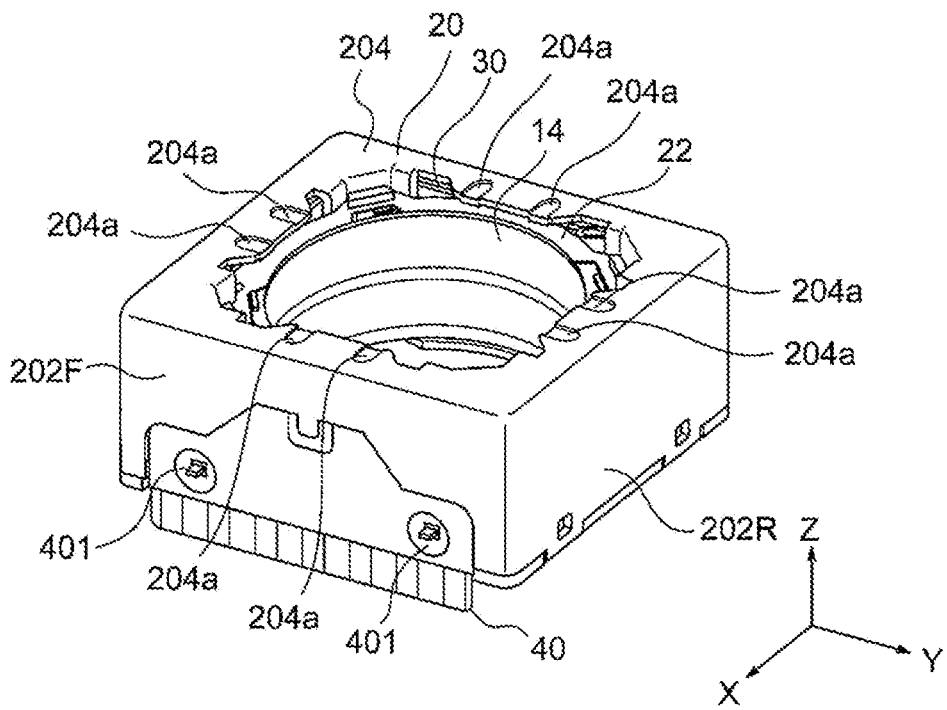
FIG. 29 is a perspective view of the lens holder driving device illustrated in FIG. 1.
Figure 30:
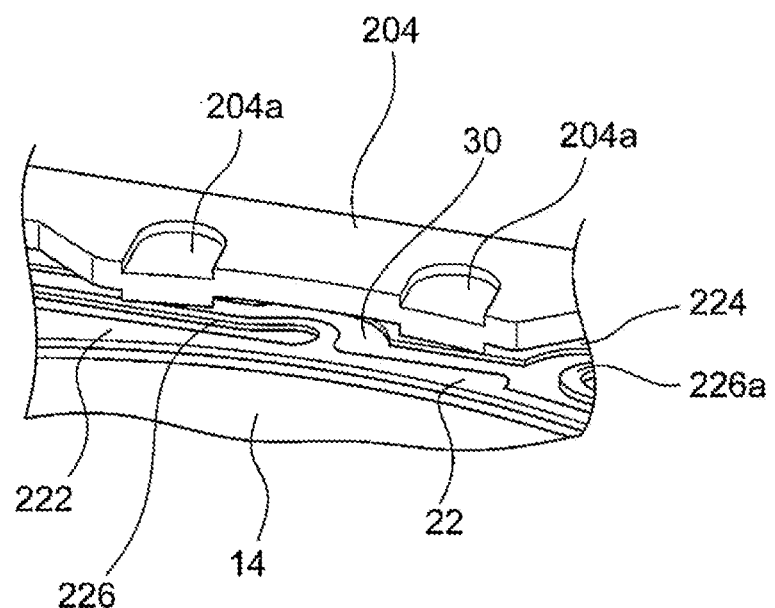
FIG. 30 is a partially enlarged view illustrating an abutting portion of an upper leaf spring and a ring-shaped upper end part of the yoke of FIG. 29 in an enlarged manner.

Next, with reference to FIG. 29 and FIG. 30, an abutting structure between upper leaf spring 22 and ring-shaped upper end part 204 of yoke 20 is described.

FIG. 29 is a perspective view of lens holder driving device 10. FIG. 30 is a partially enlarged view illustrating an abutting portion between upper leaf spring 22 and ring-shaped upper end part 204 of yoke 20 of FIG. 29 in an enlarged manner.

As illustrated in FIG. 29, ring-shaped upper end part 204 of yoke 20 of FIG. 29 includes semi-punched portions 204a that are semi-punched at eight portions on the inner periphery side.

When lens holder 14 is moved (driven) upward, upper leaf spring 22 is locked by eight semi-punched portions 204a (brought into contact with semi-punched portions 204a).

That is, eight semi-punched portions 204a of yoke 20 act as an upper side stopper (lock member) that limits the upward movement of lens holder 14.

Since a plurality of semi-punched portions 204a are formed at ring-shaped upper end part 204 of yoke 20, the strength of yoke 20 can be increased. As a result, even when a camera-equipped mobile terminal having lens holder driving device 10 is mistakenly dropped and the movable part (lens barrel 11 and lens holder 14) is brought into contact with yoke 20, it is possible to suppress deformation of yoke 20. At the time of the contact, upper leaf spring 22 makes contact with the bottom surfaces of semi-punched portions 204a of yoke 20. That is, the contact is made between metals, and therefore it is possible to suppress deformation of lens holder 14 as a molded article.

Figure 31:
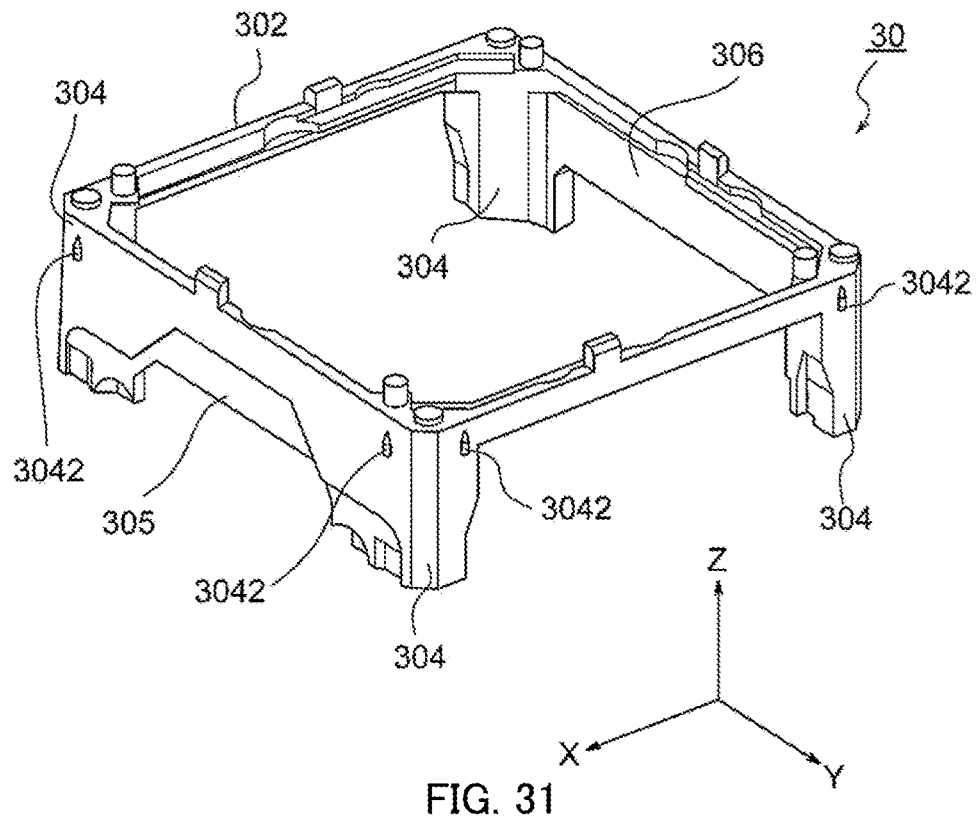
FIG. 31 is a perspective view of the spacer (inner housing) used for the lens holder driving device illustrated in FIG. 1.
Figure 32:
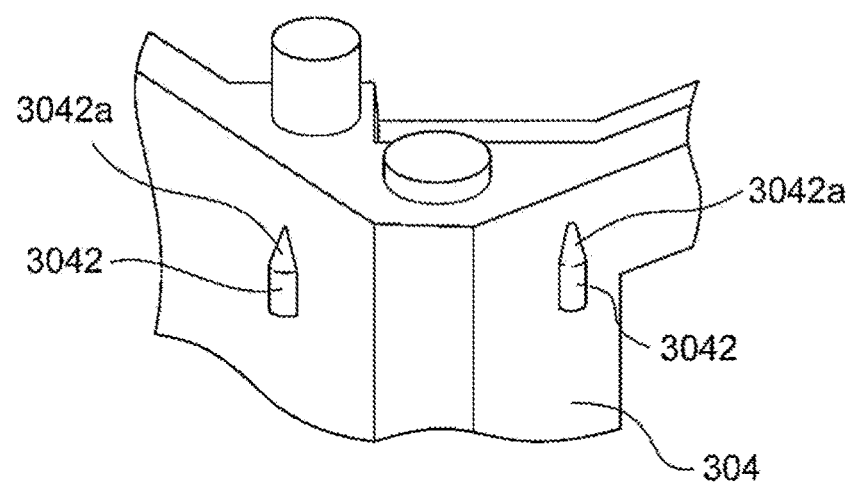
FIG. 32 is a partially enlarged view illustrating a part of FIG. 31 in an enlarged manner.

With reference to FIG. 31 and FIG. 32, a configuration of spacer (inner housing) 30 is described in more detail.

FIG. 31 is a perspective view of spacer (inner housing) 30. FIG. 32 is a partially enlarged view illustrating a part of FIG. 31 in an enlarged manner.

As illustrated in FIG. 31, each of four vertical extending parts 304 provided at four corners of spacer (inner housing) 30 has two protrusions 3042 that protrude outward in the radial direction (in FIG. 31, only four protrusions 3042 are illustrated). That is, spacer (inner housing) 30 has eight protrusions 3042 in total.

As illustrated in FIG. 32, each protrusion 3042 has a substantially half columnar shape extending in vertical direction Z (extending in a direction parallel to the direction of optical axis O). Each protrusion 3042 has top end portion 3042a having a substantially half cone shape at an upper part thereof.

Since eight protrusions 3042 are provided at four corners of spacer (inner housing) 30 in the above-mentioned manner, the position of yoke 20 can be accurately set. To be more specific, when yoke 20 is disposed to cover spacer (inner housing) 30, the inner wall of outer cylinder part 202 of yoke 20 is guided by end portions 3042a having a substantially half cone shape, and pushes down eight protrusions 3042 of spacer (inner housing) 30, and consequently, yoke 20 and spacer (inner housing) 30 are fitted to each other in a lightly pressed state. As a result, rattle of yoke 20 can be prevented.

With this configuration, shift of the central axis of yoke 20 with respect to optical axis O of the lens can be adjusted. As a result, it is possible to equalize the influence of the interference of the magnetism generated from the magnetic circuit composed of driving magnet 18 and yoke 20 on the pair of sensor magnets 342. This also makes it possible to limit the level of the sub resonance of lens holder driving device 10 to a small level.

Lens holder driving device 10 according to the first embodiment controls the position of lens holder 14 in the direction of optical axis O by feedback control as described next.

First, a driving current is supplied to driving coil 16 to move lens holder 14 in the direction of optical axis O, and the position of lens holder 14 in the direction of optical axis O (detection position) and the detection value detected at hole sensor 344 of position detection part 34 are measured. In this manner, the relationship of the driving current, the detection position, and the detection value is determined. The driving current and the detection position correspond to each other in one-to-one relationship. Accordingly, when moving lens holder 14 to a desired target position (a position in the direction of optical axis O), it suffices to supply driving coil 16 with a driving current corresponding to the target position.

To achieve conversion of a detection value into a detection position, the relationship between the detection value and the detection position (one-to-one relationship) is stored in a ROM (read-only memory). Accordingly, the ROM serves as a conversion part that converts a detection value into a detection position.

A control part (not illustrated) for achieving feedback control determines a driving current required for moving lens holder 14 to a target position on the basis of an image signal of the imaging device and a detection value detected by hole sensor 344, and supplies the determined driving current to driving coil 16.

The control part includes the above-mentioned conversion part (ROM), a target position calculation part, a comparison part, and an operation part. The target position calculation part calculates a target position (focusing position) of lens holder 14 based on an image signal of the imaging device. Here, the focusing position is a position of lens holder 14 where the contrast value of a captured image obtained by processing of an image signal is optimized. The comparison part compares the target position and the detection position, and outputs a control deviation. The operation part supplies an operation amount at which the control deviation is zero as a driving current to driving coil 16.

By performing feedback control in the above-mentioned manner, lens holder 14 can be stopped at a target position (focusing position) in the direction of optical axis O in a short time of 10 milliseconds to 20 milliseconds, for example.

Figure 33:
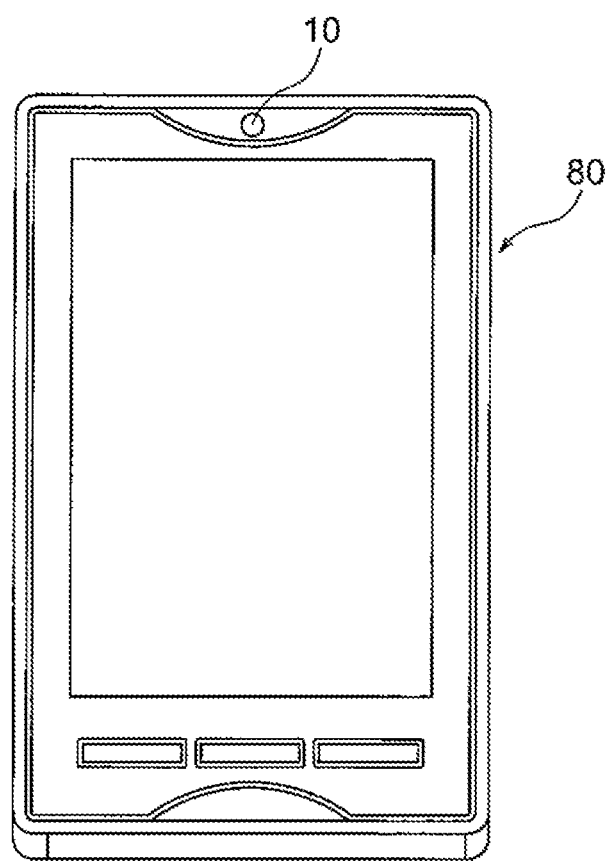
FIG. 33 is a perspective view illustrating a camera-equipped mobile terminal in which the lens holder driving device illustrated in FIG. 1 is installed.

FIG. 33 is a perspective view illustrating camera-equipped mobile terminal 80 in which lens holder driving device 10 is installed. Camera-equipped mobile terminal 80 illustrated in the drawing is composed of a smartphone. Lens holder driving device 10 is attached at a predetermined position of camera-equipped mobile terminal 80. With this structure, the user can capture an image by using camera-equipped mobile terminal 80.

While camera-equipped mobile terminal 80 is composed of a smartphone in this example, the camera-equipped mobile terminal may be a camera-equipped mobile phone, a note-type personal computer, a tablet-type personal computer, a mobile game machine, a Web camera, or an in-vehicle camera.

(Second Embodiment)

Figure 34:
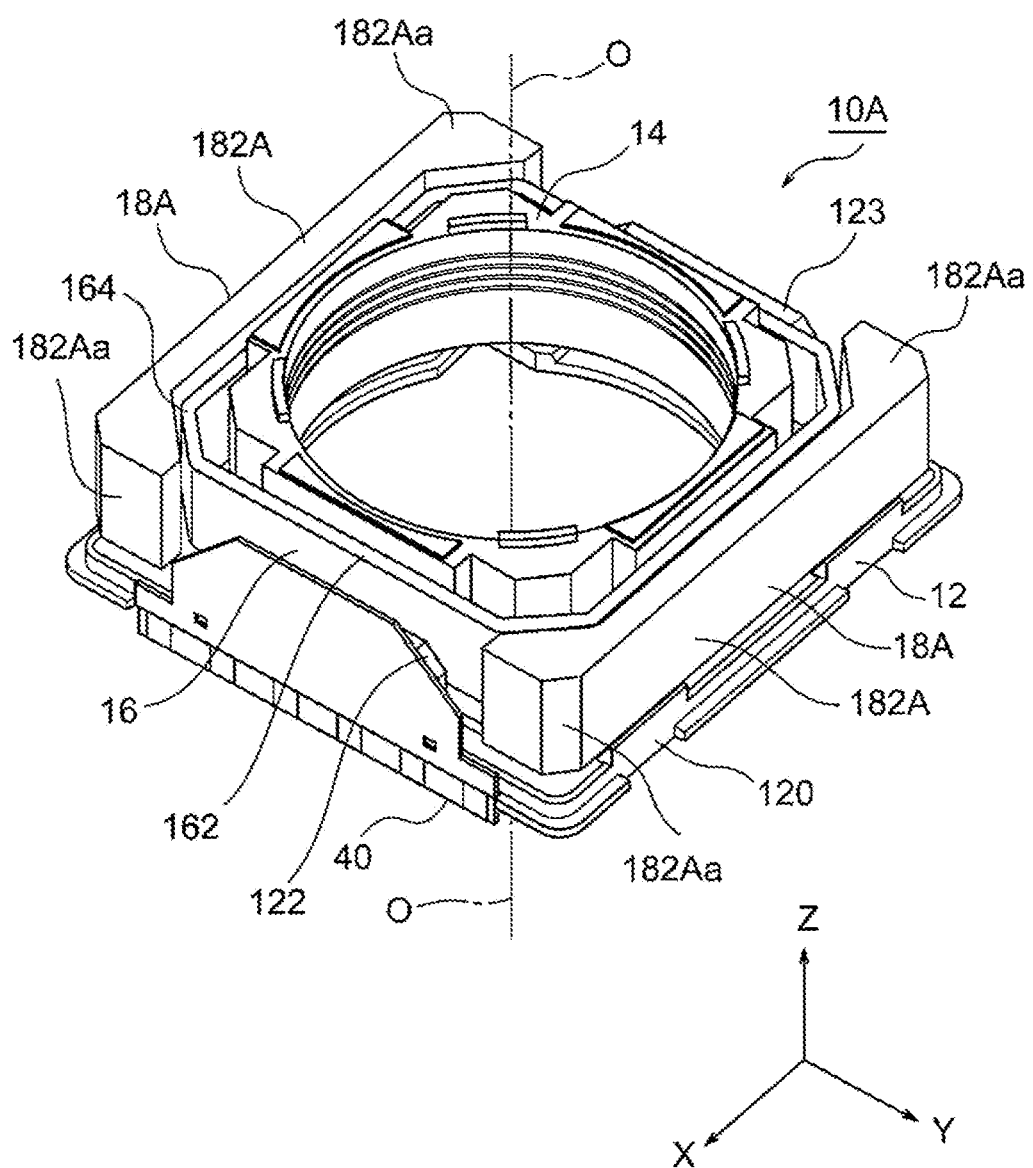
FIG. 34 is a perspective view of a lens holder driving device according to a second embodiment of the present invention in which the yoke, the upper leaf spring, and the spacer (inner housing) are omitted.
Figure 35:
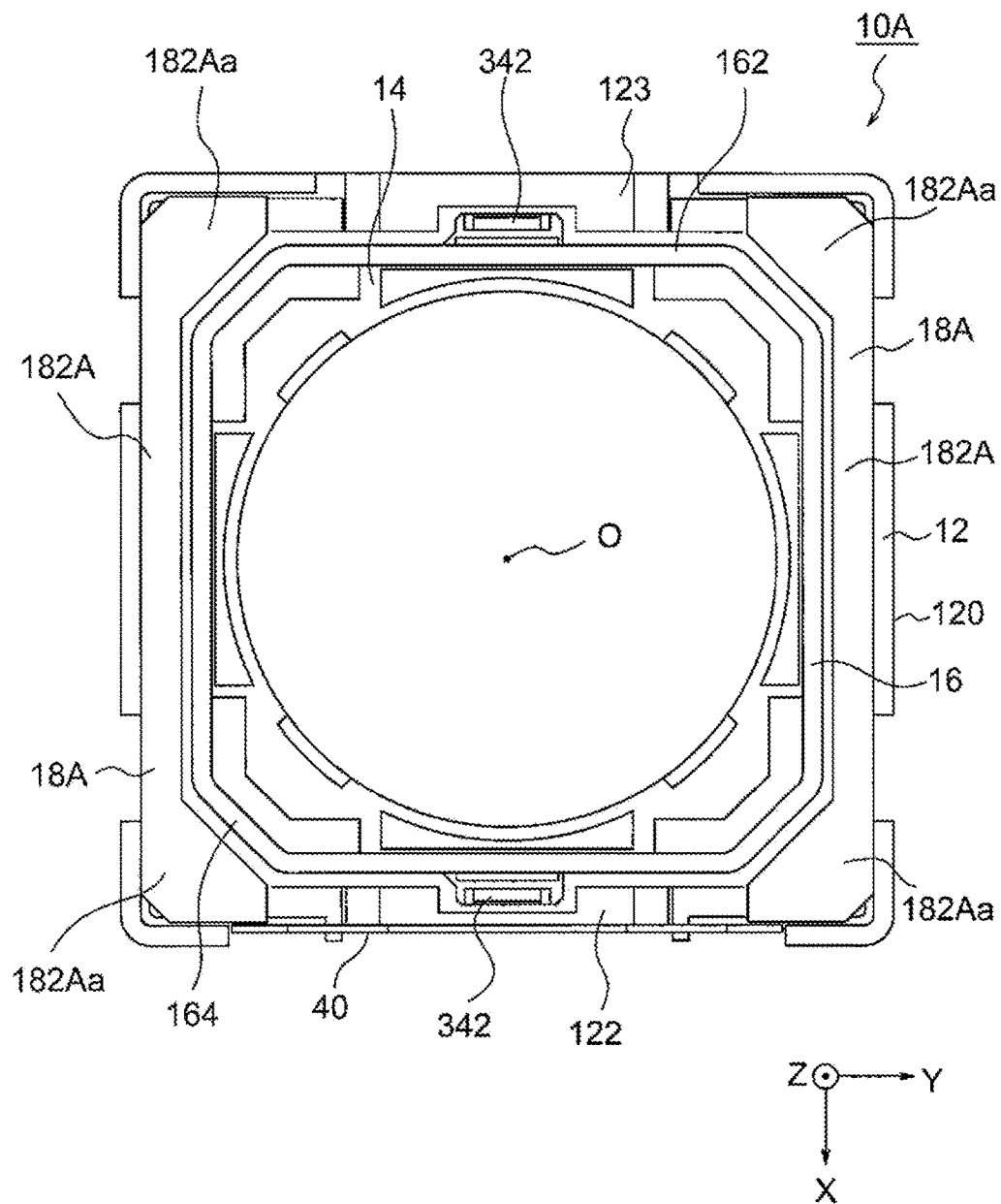
FIG. 35 is a plan view of the lens holder driving device illustrated in FIG. 34.

With reference to FIGS. 34 and 35, lens holder driving device 10A according to a second embodiment of the present invention is described.

FIG. 34 is a perspective view of lens holder driving device 10A in which yoke 20, upper leaf spring 22, and spacer (inner housing) 30 are omitted. FIG. 35 is a plan view of lens holder driving device 10A illustrated in FIG. 34.

Here, as illustrated in FIG. 34 and FIG. 35, an orthogonal coordinate system (X, Y, Z) is used. In the orthogonal coordinate system (X, Y, Z) of FIG. 34 and FIG. 35, the X-axis direction is the front-rear direction (depth direction), the Y-axis direction is the horizontal direction (width direction), and the Z-axis direction is the vertical direction (height direction). In addition, in the example illustrated in FIG. 34 and FIG. 35, vertical direction Z is the direction of optical axis O of the lens. It is to be noted that, in the present embodiment, the Y-axis direction (horizontal direction) is also referred to as first direction, and the X-axis direction (front-rear direction) is also referred to as second direction.

It should be noted that, when actually used, the direction of optical axis O, that is, the Z-axis direction is the front-rear direction. In other words, the upward direction of the Z axis is the forward direction, and the downward direction of the Z axis is the rearward direction.

Lens holder driving device 10A illustrated in the drawing is used in a mobile terminal capable of performing auto focus (AF) such as a camera-equipped mobile phone, a smartphone illustrated in FIG. 33, a note-type personal computer, a tablet-type personal computer, a mobile game machine, a Web camera, and an in-vehicle camera.

Except for the following difference of the driving magnet, lens holder driving device 10A illustrated in the drawing has a configuration identical to that of lens holder driving device 10 illustrated in FIG. 1 to FIG. 4, and operates similarly to lens holder driving device 10 illustrated in FIG. 1 to FIG. 4. Accordingly, the driving magnet is denoted with reference numeral 18A. Components having functions similar to those of the components of lens holder driving device 10 illustrated in FIG. 1 to FIG. 4 are denoted with the same reference numerals, and the description thereof will be omitted for simplification.

As with driving magnet 18 according to the first embodiment, driving magnet 18A is composed of two plate-shaped driving magnet pieces 182A; however, the shape of driving magnet 18A is different from that of plate-shaped driving magnet piece 182 of driving magnet 18.

Specifically, each of two plate-shaped driving magnet pieces 182A has, at both end portions thereof, protrusion part 182Aa having a substantially triangular prism shape that are disposed to be opposite to four short side parts 164 of driving coil 16 at four corners of yoke 20 (see FIG. 2). The inner periphery side of each protrusion part 182Aa has a planar shape. Accordingly, plate-shaped driving magnet piece 182A can be readily manufactured.

Lens holder driving device 10A according to the second embodiment can achieve an effect similar to that of lens holder driving device 10 according to the first embodiment, and in addition, can achieve an effect described next.

Specifically, since each of two plate-shaped driving magnet pieces 182A has protrusion part 182Aa having a substantially triangular prism shape at both end portions thereof, the thrust of the driving mechanism according to the second embodiment can be advantageously increased in comparison with the driving mechanism according to the first embodiment.

(Third Embodiment)

Figure 36:
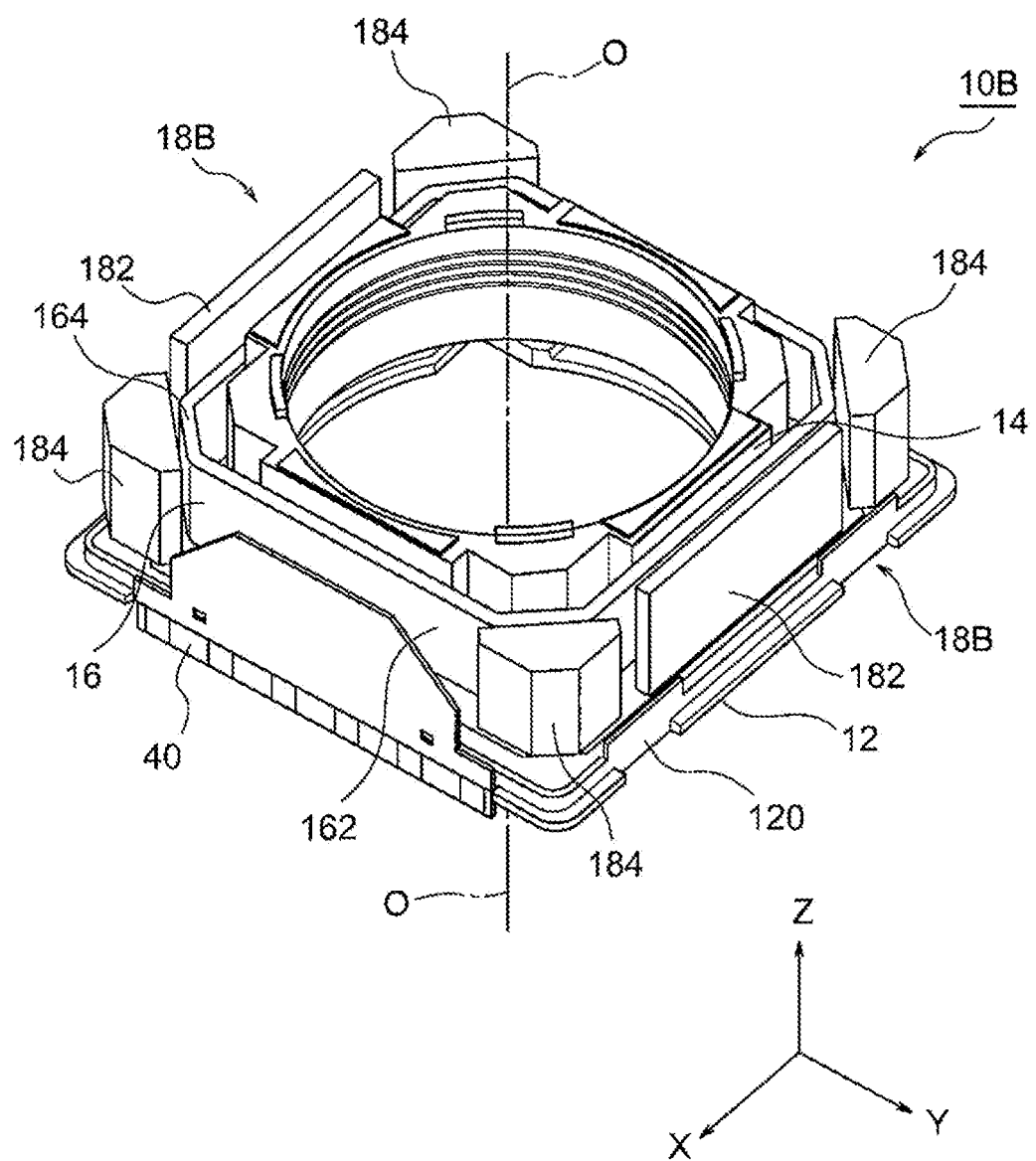
FIG. 36 is a perspective view of a lens holder driving device according to a third embodiment of the present invention in which the yoke, the upper leaf spring, and the spacer (inner housing) are omitted.
Figure 37:
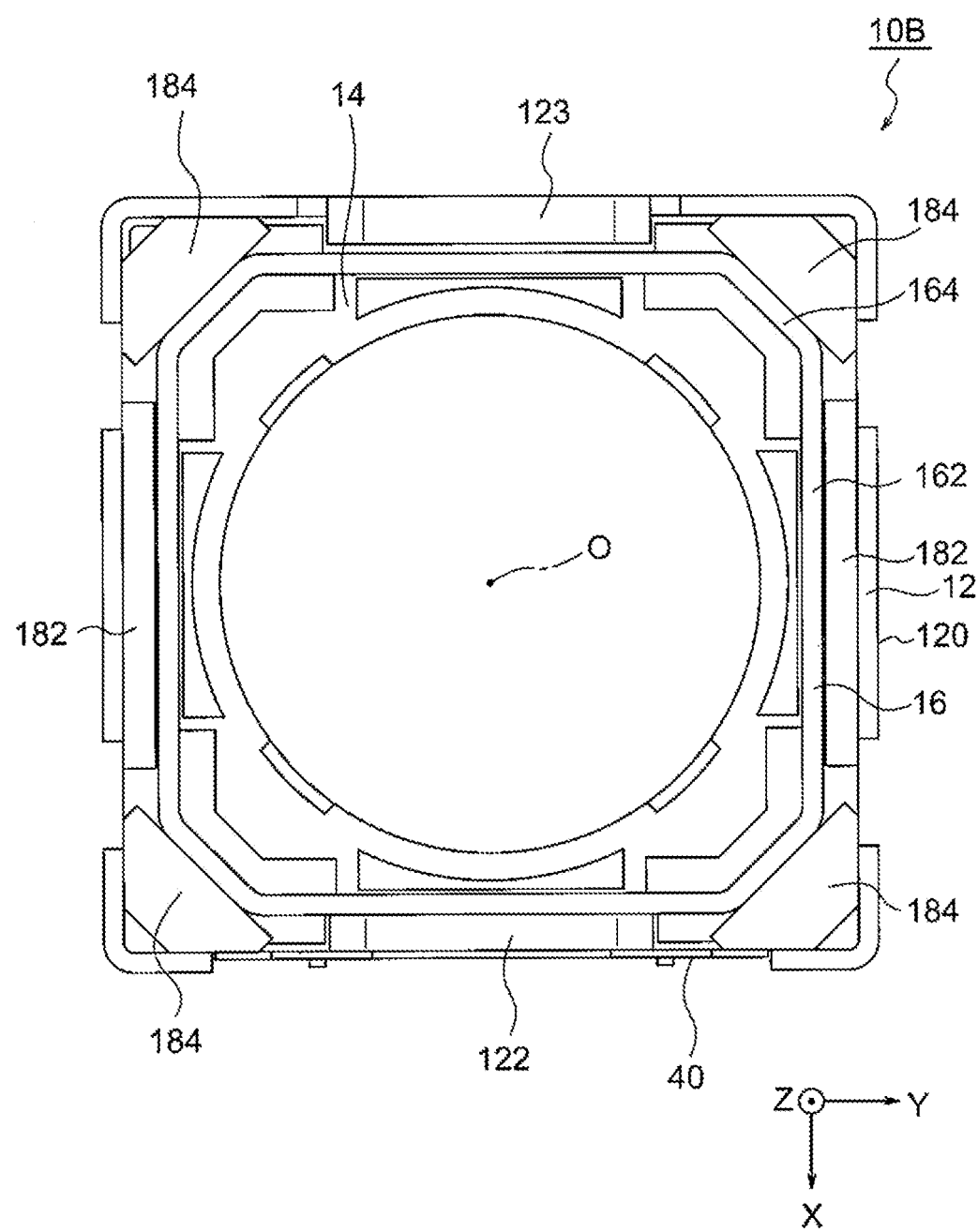
FIG. 37 is a plan view of the lens holder driving device illustrated in FIG. 36.

With reference to FIG. 36 and FIG. 37, lens holder driving device 10B according to a third embodiment of the present invention is described.

FIG. 36 is a perspective view of lens holder driving device 10B in which yoke 20, upper leaf spring 22, and spacer (inner housing) 30 are omitted. FIG. 37 is a plan view of lens holder driving device 10B illustrated in FIG. 36.

Here, as illustrated in FIG. 36 and FIG. 37, an orthogonal coordinate system (X, Y, Z) is used. In the orthogonal coordinate system (X, Y, Z) of FIG. 36 and FIG. 37, the X-axis direction is the front-rear direction (depth direction), the Y-axis direction is the horizontal direction (width direction), and the Z-axis direction is the vertical direction (height direction). In addition, in the example illustrated in FIG. 36 and FIG. 37, vertical direction Z is the direction of optical axis O of the lens. It is to be noted that, in the present embodiment, the Y-axis direction (horizontal direction) is also referred to as first direction, and the X-axis direction (front-rear direction) is also referred to as second direction.

It should be noted that, when actually used, the direction of optical axis O, that is, the Z-axis direction is the front-rear direction. In other words, the upward direction of the Z axis is the forward direction, and the downward direction of the Z axis is the rearward direction.

Lens holder driving device 10B illustrated in the drawing is used in a mobile terminal capable of performing auto focus (AF) such as a camera-equipped mobile phone, a smartphone illustrated in FIG. 33, a note-type personal computer, a tablet-type personal computer, a mobile game machine, a Web camera, and an in-vehicle camera.

Except for the following difference of the driving magnet described later, lens holder driving device 10B illustrated in the drawing has a configuration identical to that of lens holder driving device 10 illustrated in FIG. 1 to FIG. 4, and operates similarly to lens holder driving device 10 illustrated in FIG. 1 to FIG. 4. Components having functions similar to those of the components of lens holder driving device 10 illustrated in FIG. 1 to FIG. 4 are denoted with the same reference numerals, and the description thereof will be omitted for simplification.

Driving magnet 18B further includes four driving magnet pieces 184 having a substantially triangular prism shape which are respectively opposite to four short side parts 164 of driving coil 16 at four corners of the yoke in addition to two plate-shaped driving magnet pieces 182. The inner periphery side of each driving magnet piece 184 has a planar shape. Accordingly, driving magnet piece 184 can be readily manufactured.

Lens holder driving device 10B according to the third embodiment can achieve an effect similar to that of lens holder driving device 10 according to the first embodiment, and in addition, can achieve an effect described next.

That is, since driving magnet 18 includes not only two plate-shaped driving magnet pieces 182, but also four driving magnet pieces 184 having a substantially triangular prism shape, the thrust of the driving mechanism according to the third embodiment can be advantageously increased in comparison with the driving mechanism according to the first embodiment.

An exemplary mode of the present invention is described below.

In the exemplary mode of the present invention, a lens holder driving device (10; 10A; 10B) includes: a lens holder

(14) to which a lens barrel (11) is attachable; a fixing part (12, 30) disposed at an outer periphery of the lens holder (14); a driving mechanism (16, 18; 18A; 18B, 20) for driving the lens holder (14) in a direction of an optical axis (O) of a lens; an upper leaf spring (22) configured to couple the lens holder (14) and the fixing part (12, 30) at an upper part thereof; a lower leaf spring (24) configured to couple the lens holder (14) and the fixing part (12, 30) at a lower part thereof; and a position detection part (34) configured to detect a position of the lens holder (14) in the direction of the optical axis (O). The fixing part includes a base member (12) disposed on a lower side of the lens holder (14); the driving mechanism includes a driving coil (16) fixed at a periphery of the lens holder (14), a yoke (20) having a substantially quadrangular cylindrical shape uprightly provided on the base member (12), and a driving magnet (18; 18A; 18B) including plate-shaped driving magnet pieces (182; 182A) which are disposed at a pair of inner wall surfaces of the yoke (20) opposite to each other in a first direction (Y) orthogonal to the direction of the optical axis (O), the plate-shaped driving magnet pieces (182; 182A) being disposed to be opposite to the driving coil (16); and the position detection part includes a sensor magnet (342a) as one of a pair of sensor magnets (342a, 342b) attached on corresponding outer peripheral surfaces of the lens holder (14) in a second direction (X) orthogonal to the direction of the optical axis (O) and the first direction (Y), and a magnetic detection device (344) provided to the base member (12) such that the magnetic detection device (344) is opposite to the sensor magnet (342a).

In the lens holder driving device (10; 10A; 10B), the plate-shaped driving magnet pieces (182; 182A) and the pair of sensor magnets (342a, 342b) are preferably disposed at positions which are point symmetrical about the optical axis (O). The position detection part (34) may be provided in a region around the lower leaf spring (24); and the driving coil (16) is provided in a region on a side closer to the upper leaf spring (22). In this case, the yoke (20) desirably has cutout parts (202a, 202b) at portions opposite to the pair of sensor magnets (342a, 342b).

In the lens holder driving device (10; 10A; 10B), the plate-shaped driving magnet pieces (182; 182A) are magnetized in the radial direction; and the pair of sensor magnets (342a, 342b) are magnetized in the direction of the optical axis (O). In this case, preferably, the plate-shaped driving magnet pieces (182; 182A) are magnetized such that an inner periphery side thereof is a first pole, and an outer periphery side thereof is a second pole; and each of the pair of sensor magnets (342a, 342b) is magnetized such that an upper surface side thereof is the second pole, and a bottom surface side thereof is the first pole. It is to be noted that the first pole is one of N pole and S pole; and the second pole is the other of N pole and S pole. In addition, desirably, each of the pair of sensor magnets (342a, 342b) is composed of a permanent magnet whose Curie point is 400° C. or above.

In the lens holder driving device (10; 10A; 10B), the driving coil (16) may have an octagonal cylindrical shape with four long side parts (162) which are opposite to and parallel to four sides of the yoke (20) and four short side parts (164) which are opposite to four corners of the yoke (20). In this case, the plate-shaped driving magnet piece (182A) preferably has protrusion parts (182Aa) having a substantially triangular prism shape at both end portions of the plate-shaped driving magnet piece (182A), the protrusion parts (182Aa) being respectively opposite to the four short side parts (164) of the driving coil (16) at the four corners of the yoke (20). Alternatively, the driving magnet (18B) may further include four driving magnet pieces (184) having a substantially triangular prism shape which are respectively opposite to the four short side parts (164) of the driving coil (16) at the four corners of the yoke (20).

According to a second exemplary mode of the present invention, a camera-equipped mobile terminal (80) in which the above-mentioned lens holder driving device (10; 10A; 10B) is installed can be obtained.

It is to be noted that the reference numerals in parentheses are merely examples intended for convenience of description of the present invention, and the present invention is not limited thereto.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while driving magnet 18 is composed of two plate-shaped driving magnet pieces 182 disposed to be opposite to driving coil 16 at a pair of inner wall surfaces of yoke 20 which are opposite to each other in the first embodiment, the driving magnet of the embodiment of the present invention is not limited to this. Specifically, as long as the driving magnet can uniformly (that is, symmetrically about a plane of second direction X which passes through optical axis O) generate magnetic field, the shape and the number of the driving magnet pieces of the driving magnet of the embodiment of the present invention are not limited.

This application is entitled to and claims the benefit of Japanese Patent Application No. 2014-138233 filed on Jul. 4, 2014, the disclosure each of which including the specification, drawings and abstract is incorporated herein by reference in its entirety.

REFERENCE SIGNS LIST 10, 10A, 10B Lens holder driving device
11 Lens barrel
12 Base member (actuator base)
120 Base part
122 Front protruding part (first protruding part)
122a Rectangular hole
122b C plane
123 Rear protruding part (second protruding part)
14 Lens holder
140 Cylindrical part
140a Housing part
16 Driving coil
162 Long side part
164 Short side part
18, 18A, 18B Driving magnet
182, 182A Plate-shaped driving magnet piece
182Aa Substantially triangular prism shape protrusion part
184 Substantially triangular prism shape driving magnet piece
20 Yoke
202 Outer cylinder part
202a Front cutout part (first cutout part)
202b Rear cutout part (second cutout part)
202F Front plate part (first plate part)
202B Rear plate part (second plate part)
202L Left plate part
202R Right plate part
204 Ring-shaped upper end part
204a Semi-punched portion
206 Inner vertical extending part 207 Protrusion part
22 Upper leaf spring
222 Upper inner periphery end part
224 Upper outer periphery end part
226 Upper arm part
226a U-turn-shaped portion
24 Lower leaf spring
24-1 First spring piece
24-2 Second spring piece
242 Lower inner periphery end part
242-1 First terminal part
242-2 Second terminal part
244 Lower outer periphery end part
244-1 First external connection terminal
244-2 Second external connection terminal
246 Lower arm part
246a U-turn-shaped portion
247 Positioning protrusion
30 Spacer (inner housing)
302 Ring-shaped part
30 Four vertical extending parts
304 Two protrusions
3042a Top end portion
305 Front U-shaped plate part (first U-shaped plate part)
306 Rear U-shaped plate part (second U-shaped plate part)
34 Position detection part
342a Sensor magnet
342b Sensor magnet
344 Hole sensor (magnetic detection device)
40 Flexible printed circuit (FPC)
401 Cone-shaped depression
402 Base material
402a First conductor pattern
402ag Grounding pattern
402b Second conductor pattern
404 First cover film (light shielding film)
406 Second cover film
45 Elastic adhesive agent (stretchable and flexible resin)
52, 54 Solder
80 Camera-equipped mobile terminal (smartphone)
O Optical axis
X Front-rear direction (second direction)
Y Horizontal direction (first direction)
Z Vertical direction

The invention claimed is:

1. A lens holder driving device, comprising:
a lens holder to which a lens barrel is attachable;
a fixing part disposed at an outer periphery of the lens holder;
a driving mechanism to drive the lens holder in a direction of an optical axis of a lens;
an upper leaf spring to couple the lens holder and the fixing part at an upper part thereof;
a lower leaf spring to couple the lens holder and the fixing part at a lower part thereof; and
a position detection part to detect a position of the lens holder in the direction of the optical axis, wherein:
the fixing part includes a base member disposed on a lower side of the lens holder;
the driving mechanism includes:
a driving coil fixed at a periphery of the lens holder,
a yoke having a substantially quadrangular cylindrical shape uprightly provided on the base member, and
a driving magnet including plate-shaped driving magnet pieces which are disposed at a pair of inner wall surfaces of the yoke opposite to each other in a first direction orthogonal to the direction of the optical axis, the plate-shaped driving magnet pieces being disposed to be opposite to the driving coil;
the position detection part includes:
a sensor magnet as one of a pair of sensor magnets attached on corresponding outer peripheral surfaces of the lens holder in a second direction orthogonal to the direction of the optical axis and the first direction, and
a magnetic detection device provided to the base member such that the magnetic detection device is opposite to the sensor magnet;
the plate-shaped driving magnet pieces and the pair of sensor magnets are disposed at positions which are point symmetrical about the optical axis;
wherein the position detection part is provided in a region around the lower leaf spring;
wherein the driving coil is provided in a region on a side closer to the upper leaf spring; and
wherein the yoke has cutout parts at portions opposite to the pair of sensor magnets.

2. The lens holder driving device according to claim 1, wherein:
the first pole is one of N pole and S pole; and
the second pole is the other of the N pole and the S pole.

3. The lens holder driving device according to claim 1, wherein each of the pair of sensor magnets is composed of a permanent magnet whose Curie point is 400° C. or above.

4. The lens holder driving device according to claim 1, wherein:
the driving coil has an octagonal cylindrical shape with four long side parts which are opposite to and parallel to four sides of the yoke and four short side parts which are opposite to four corners of the yoke; and
the plate-shaped driving magnet piece has protrusion parts having a substantially triangular prism shape at both end portions of the plate-shaped driving magnet piece, the protrusion parts being respectively opposite to the four short side parts of the driving coil at the four corners of the yoke.

5. The lens holder driving device according to claim 1, wherein:
the driving coil has an octagonal cylindrical shape with four long side parts which are opposite to and parallel to four sides of the yoke and four short side parts which are opposite to four corners of the yoke; and
the driving magnet further includes four driving magnet pieces having a substantially triangular prism shape which are respectively opposite to the four short side parts of the driving coil at the four corners of the yoke.

6. A camera-equipped mobile terminal in which the lens holder driving device according to of claim 1 is installed.

7. A lens holder driving device, comprising
a lens holder to which a lens barrel is attachable;
a fixing part disposed at an outer periphery of the lens holder;
a driving mechanism to drive the lens holder in a direction of an optical axis of a lens;
an upper leaf spring to couple the lens holder and the fixing part at an upper part thereof;
a lower leaf spring to couple the lens holder and the fixing part at a lower part thereof; and
a position detection part to detect a position of the lens holder in the direction of the optical axis, wherein:
the fixing part includes a base member disposed on a lower side of the lens holder;

the driving mechanism includes:
- a driving coil fixed at a periphery of the lens holder,
- a yoke having a substantially quadrangular cylindrical shape uprightly provided on the base member, and
- a driving magnet including plate-shaped driving magnet pieces which are disposed at a pair of inner wall surfaces of the yoke opposite to each other in a first direction orthogonal to the direction of the optical axis, the plate-shaped driving magnet pieces being disposed to be opposite to the driving coil;

the position detection part includes:
- a sensor magnet as one of a pair of sensor magnets attached on corresponding outer peripheral surfaces of the lens holder in a second direction orthogonal to the direction of the optical axis and the first direction, and
- a magnetic detection device provided to the base member such that the magnetic detection device is opposite to the sensor magnet;

the plate-shaped driving magnet pieces and the pair of sensor magnets are disposed at positions which are point symmetrical about the optical axis;

wherein the plate-shaped driving magnet pieces are magnetized in the radial direction;

wherein the pair of sensor magnets are magnetized in the direction of the optical axis;

wherein the plate-shaped driving magnet pieces are magnetized such that an inner periphery side thereof is a first pole, and an outer periphery side thereof is a second pole; and wherein each of the pair of sensor magnets is magnetized such that an upper surface side thereof is the second pole, and a bottom surface side thereof is the first pole.

8. The lens holder driving device according to claim 7, wherein:

the first pole is one of N pole and S pole; and the second pole is the other of N pole and S pole.

9. The lens holder driving device according to claim 7, wherein each of the pair of sensor magnets is composed of a permanent magnet whose Curie point is 400° C. or above.

10. The lens holder driving device according to claim 7, wherein:

the driving coil has an octagonal cylindrical shape with four long side parts Which are opposite to and parallel to four sides of the yoke and four short side parts which are opposite to four corners of the yoke; and the plate-shaped driving magnet piece has protrusion parts having a substantially triangular prism shape at both end portions of the plate-shaped driving magnet piece, the protrusion parts being respectively opposite to the four short side parts of the driving coil at the four corners of the yoke.

11. The lens holder driving device according to claim 7, wherein:

the driving coil has an octagonal cylindrical shape with four long side parts which are opposite to and parallel to four sides of the yoke and four short side parts which are opposite to four corners of the yoke; and the driving magnet further includes four driving magnet pieces having a substantially triangular prism shape which are respectively opposite to the four short side parts of the driving coil at the four corners of the yoke.

12. A camera-equipped mobile terminal in which the lens holder driving device according to of claim 7 is installed.

* * * * *